United States Patent
Takaishi

(10) Patent No.: US 7,372,659 B2
(45) Date of Patent: May 13, 2008

(54) HEAD POSITION CONTROL METHOD, HEAD POSITION CONTROL DEVICE AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/603,647

(22) Filed: Nov. 21, 2006

(65) Prior Publication Data

US 2008/0024906 A1    Jan. 31, 2008

(30) Foreign Application Priority Data

Jul. 28, 2006    (JP) ............... 2006-205653

(51) Int. Cl.
*G11B 5/596* (2006.01)

(52) U.S. Cl. .................................. 360/77.04

(58) Field of Classification Search ............... None
See application file for complete search history.

(56) References Cited

U.S. PATENT DOCUMENTS

| 5,404,253 | A | 4/1995 | Painter | |
|---|---|---|---|---|
| 6,347,017 | B1 * | 2/2002 | Carlson | 360/77.04 |
| 6,469,861 | B2 * | 10/2002 | Onuki et al. | 360/77.02 |
| 6,549,349 | B2 * | 4/2003 | Sri-Jayantha et al. | 360/77.02 |
| 6,819,521 | B2 * | 11/2004 | Ho et al. | 360/77.04 |
| 6,853,512 | B2 * | 2/2005 | Ozawa | 360/77.02 |
| 6,937,424 | B2 * | 8/2005 | Chang et al. | 360/77.04 |
| 6,950,268 | B2 * | 9/2005 | Inoue et al. | 360/77.07 |
| 7,145,746 | B1 * | 12/2006 | Hirano et al. | 360/77.04 |
| 7,265,934 | B2 * | 9/2007 | Takaishi | 360/77.04 |
| 2001/0003497 | A1 | 6/2001 | Takaishi | |
| 2002/0093754 | A1 * | 7/2002 | Zhang et al. | 360/77.04 |

FOREIGN PATENT DOCUMENTS

| JP | 7-50075 | 2/1994 |
|---|---|---|
| JP | 2000-21104 | 1/2000 |

* cited by examiner

*Primary Examiner*—Hoa T. Nguyen
*Assistant Examiner*—James L Habermehl
(74) *Attorney, Agent, or Firm*—Greer, Burns & Crain, Ltd.

(57) ABSTRACT

In a head position control device having a disturbance suppression function and eccentricity correction function, the interference between the eccentricity correction function and the disturbance suppression function is prevented. An eccentricity correction function and disturbance suppression control function are provided in the head positioning control system, and an interference prevention function, which detects the disturbance suppression frequency and turns OFF the feedback of the eccentricity correction control for the eccentricity correction frequency near the disturbance suppression frequency, or shifts the disturbance suppression frequency from the eccentricity correction frequency, is provided. Therefore the interference between the eccentricity correction and the disturbance suppression can be prevented, and unstable eccentricity correction can be prevented.

24 Claims, 19 Drawing Sheets

Servo Mark
Gray Code
Index

PosA PosB PosC PosD

| w | L1 | L2 | L3 | L4 | L5 | a11 | a12 | a21 | a22 |
|---|---|---|---|---|---|---|---|---|---|
| 0 | 0.4193 | 1.1180 | 0.0780 | 0.00 | -3.00 | 1.0000 | 0.0000 | 0.0000 | 1.0000 |
| 1 | 0.4215 | 1.1259 | 0.0770 | 1.06 | -2.90 | 0.9997 | -0.0234 | 0.0234 | 0.9997 |
| 2 | 0.4237 | 1.1334 | 0.0759 | 2.08 | -2.68 | 0.9989 | -0.0469 | 0.0469 | 0.9989 |
| 3 | 0.4258 | 1.1407 | 0.0748 | 3.05 | -2.36 | 0.9975 | -0.0703 | 0.0703 | 0.9975 |
| 4 | 0.4279 | 1.1478 | 0.0738 | 3.96 | -1.93 | 0.9956 | -0.0936 | 0.0936 | 0.9956 |
| ... | | | | | | | | | |
| 47 | 0.4785 | 0.9899 | 0.0439 | -39.42 | -36.72 | 0.4519 | -0.8921 | 0.8921 | 0.4519 |
| 48 | 0.4791 | 0.9408 | 0.0435 | -39.07 | -43.93 | 0.4309 | -0.9024 | 0.9024 | 0.4309 |
| 49 | 0.4797 | 0.8823 | 0.0430 | -38.07 | -51.93 | 0.4096 | -0.9123 | 0.9123 | 0.4096 |
| 50 | 0.4802 | 0.8120 | 0.0426 | -36.26 | -60.82 | 0.3881 | -0.9216 | 0.9216 | 0.3881 |
| ... | | | | | | | | | |

DISTURBANCE FREQUENCY
SETTING DISABLED RANGE

HEAD POSITION CONTROL METHOD, HEAD POSITION CONTROL DEVICE AND DISK DEVICE

CROSS-REFERENCE TO RELATED APPLICATIONS

This application is based upon and claims the benefit of priority from the prior Japanese Patent Application No. 2006-205653, filed on Jul. 28, 2006, the entire contents of which are incorporated herein by reference.

BACKGROUND OF THE INVENTION

1. Field of the Invention

The present invention relates to a head position control method for a disk device, a head position control device, and a disk device, and more particularly to a head position control method, head position control device and disk device for suppressing position deviation due to external vibration and eccentricity of the disk.

2. Description of the Related Art

It is extremely important for a disk device, such as a magnetic disk device or optical disk device, to accurately position the head on the target track of the disk in order to improve recording density.

For this positioning control, various factors interrupt positioning accuracy of the head with respect to the disk. The eccentricity of the disk, in particular, causes a deterioration of position accuracy of the head. In order to control follow up of the head to the eccentricity of the disk, an eccentricity correction method using an eccentricity estimation observer has been proposed (e.g. Japanese Patent Application Laid-Open No. H7-50075 or Japanese Patent Application Laid-Open No. 2000-21104).

Such an eccentricity estimation observer calculates a control value of an actuator from an error between an actual position error and an estimated position error, using the state estimation gains A, B, C, F and L, and calculates the state quantities (position, velocity, bias value, eccentricity) of the next sample.

Here the estimated gain L consists of an estimated position gain L1, estimated velocity gain L2 and estimated bias gain L3, and estimated eccentricity gains L4 and L5. And L1, L2 and L3 show the characteristics of the controller itself, and L4 and L5 show the response characteristics to eccentricity, which is a periodic disturbance.

SUMMARY OF THE INVENTION

In such a positioning control system, a positioning control that follows up to an external vibration, other than an eccentricity component, is in demand. In other words, as the recording density of a disk device increases, it is becoming difficult to ignore the influence of external vibration on the positioning accuracy of the head. Also as the use of disk devices expands, disk devices are now installed on mobile equipment, such as portable terminals, portable telephones and portable AV (Audio/Visual) equipment, therefore adapting to a wide range of disturbance frequencies is also demanded.

The follow up performance to disturbances, other than eccentricity, can be improved by increasing the estimated gain using prior art, but in this case, the width of the disturbance suppression range must be widened. Such correction control for disturbance and eccentricity must be performed in a range where the original characteristics of the controller are not interfered with.

In the eccentricity correction control, the control setting values are optimized by the original characteristics of the controller. However if characteristics for suppressing disturbances, other than eccentricity, are added, the characteristics of the eccentricity correction control and the characteristics of the disturbance correction control are separated, so the original control characteristics of the controller change unless the characteristics of the eccentricity correction control are changed according to the characteristics of disturbance correction control.

With the foregoing in view, it is an object of the present invention to provide a head position control method, a head position control device and a disk device for controlling a head position by performing eccentricity correction control and disturbance correction control, with preventing interference between the eccentricity correction control and disturbance correction control.

It is another object of the present invention to provide a head position control method, a head position control device and a disk device for preventing vibration of the head by appropriately executing eccentricity correction control and disturbance correction control without affecting the original control characteristics of the controller.

It is still another object of the present invention to provide a head position control method, a head position control device and a disk device for improving the follow up performance of the head by adapting to the frequencies of eccentricity and disturbance without affecting the original control characteristics of the controller.

It is still another object of the present invention to provide a head position control method, a head position control device and a disk device, for improving read/write characteristics of the head by adapting to the frequencies of eccentricity and disturbance without affecting the control characteristics of the observer.

The head positioning control method of the present invention has a step of computing a position error from a target position of the head and a current position acquired from the head; a step of computing a control value of the actuator; a step of computing an eccentricity correction value of an eccentricity frequency of a disk storage medium according to the position error; a step of computing a disturbance suppression value of a desired disturbance frequency according to the position error; a step of computing a drive value of the actuator from the control value, the eccentricity correction value and the disturbance suppression value; a step of detecting whether the disturbance frequency and a plurality of the eccentricity frequencies interfere with each other; and an interference prevention step of turning OFF the computation of the eccentricity correction value for the eccentricity frequency, which interferes, according to the position error, or shifting the desired disturbance frequency, if the interference is detected.

The disk device of the present invention has a head for at least reading data of a disk storage medium; an actuator for positioning the head in a predetermined position of the disk storage medium; and a control unit for computing a position error from a target position of the head and a current position acquired from the head, computing a control value of the actuator according to the position error, an eccentricity correction value of an eccentricity frequency of the disk storage medium according to the position error, and a disturbance suppression value of a desired disturbance frequency according to the position error, and computing a drive value of the actuator from the control value, the eccentricity correction value and the disturbance suppression value. And the control unit detects whether the disturbance frequency and a plurality of the eccentricity frequencies interference with each other, and turns OFF the computation of the eccentricity correction value for the eccentricity frequency, which interferes, according to the position error, or shifts the desired disturbance frequency if the interference is detected.

The head position control device of the present invention is a head position control device for positioning a head which at least reads data of a disk storage medium in a predetermined position of the disk storage medium by controlling an actuator, having: a processing unit for computing a position error from a target position of the head and a current position acquired from the head, computing a control value of the actuator, an eccentricity correction value of an eccentricity frequency of the disk storage medium according to the position error, and a disturbance suppression value of a desired disturbance frequency according to the position error, and computing a drive value of the actuator from the control value, the eccentricity correction value and the disturbance suppression value; and an interference prevention unit for detecting whether the disturbance frequency and a plurality of the eccentricity frequencies interfere with each other, and turning OFF the computation of the eccentricity correction value for the eccentricity frequency, which interferes, according to the position error, or shifting the desired disturbance frequency, if the interference is detected.

In the present invention, it is preferable that the step of computing the eccentricity correction value has a step of computing each eccentricity correction value of the eccentricity frequencies having a plurality of orders of a rotation frequency of the disk storage medium respectively according to the position error.

Also in the present invention, it is preferable that the step of computing the disturbance suppression value has a step of estimating the disturbance frequency by adaptive control according to the position error, and a step of computing the disturbance suppression value from the position error using parameters corresponding to the estimated disturbance frequency.

Also in the present invention, it is preferable that the step of computing the disturbance suppression value has a step of setting the disturbance frequency to be suppressed as an initial value, a step of estimating a disturbance frequency by adaptive control using the disturbance frequency which is set as the initial value, and a step of computing the disturbance suppression value from the position error using parameters corresponding to the estimate disturbance frequency.

Also in the present invention, it is preferable that the step of computing the disturbance suppression value has a step of setting the disturbance frequency to be suppressed, and a step of computing the disturbance frequency suppression value from the position error using parameters corresponding to the disturbance frequency which is set.

Also in the present invention, it is preferable that the interference prevention step has a step of turning OFF the input of the position error to the eccentricity correction value computing processing according to the position error for the eccentricity frequency which interferes.

Also in the present invention, it is preferable that the interference prevention step has a step of shifting the disturbance frequency of processing, for computing a disturbance suppression value of a desired disturbance frequency, from the eccentricity frequency which interferes, according to the position error.

Also in the present invention, it is preferable that the step of computing the control value has a step of creating state information using an estimated gain of the actuator according to an estimated position error between the position error and an estimated position of an observer, and computing a control value of the actuator from the state information by the observer control of a model of the actuator, and the step of computing the disturbance suppression value has a step of creating state information using an estimated gain of the disturbance according to the estimated position error, and computing the disturbance suppression value from the state information by the observer control of a model of the disturbance, which is separate from the model of an actuator.

When the eccentricity correction and disturbance suppression control are executed in the head positioning control system, the disturbance suppression frequency is detected and the feedback of the eccentricity correction control of the eccentricity correction frequency near the disturbance suppression frequency is turned OFF, or the disturbance suppression frequency is shifted from the eccentricity correction frequency. Therefore, interference between the eccentricity correction and disturbance suppression can be prevented, and unstable eccentricity correction can be prevented.

DESCRIPTION OF THE PREFERRED EMBODIMENTS

Embodiments of the present invention will now be described in the sequence of the disk device, first embodiment of position control system, observer configuration of first embodiment, second embodiment, third embodiment, fourth embodiment, fifth embodiment and other embodiments, but the present invention is not limited to these embodiments.

Disk Device

Figure 1:
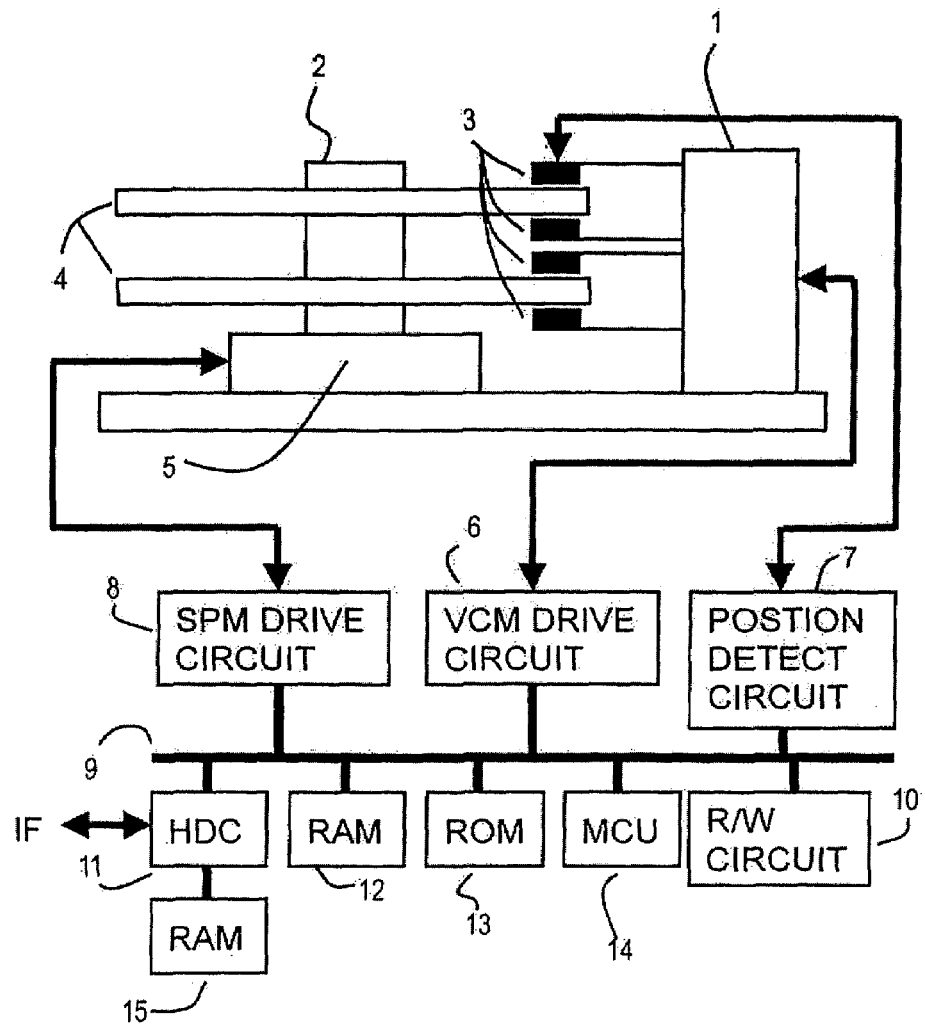
FIG. 1 is a block diagram depicting a disk device according to an embodiment of the present invention.
Figure 2:
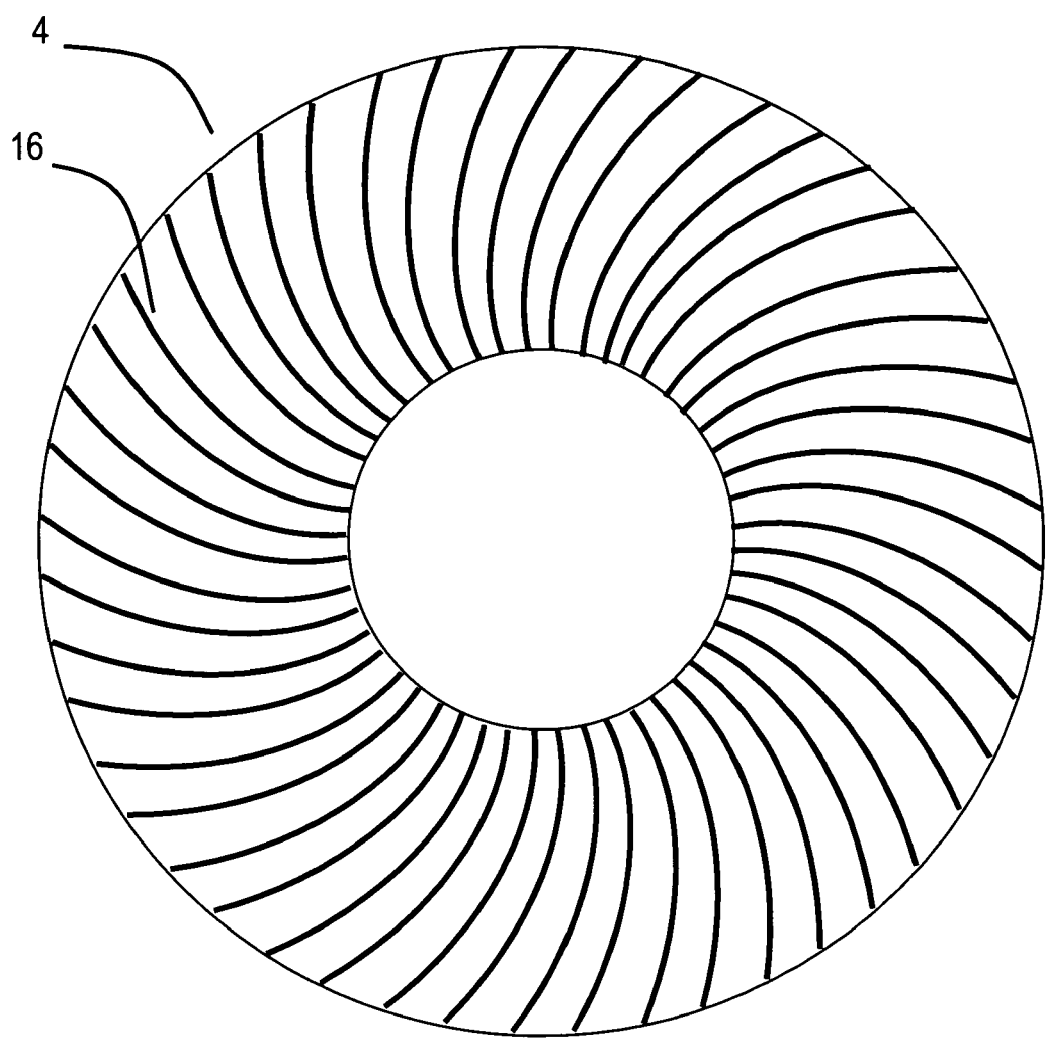
FIG. 2 is a diagram depicting the position signals of the disk in FIG. 1.
Figure 3:
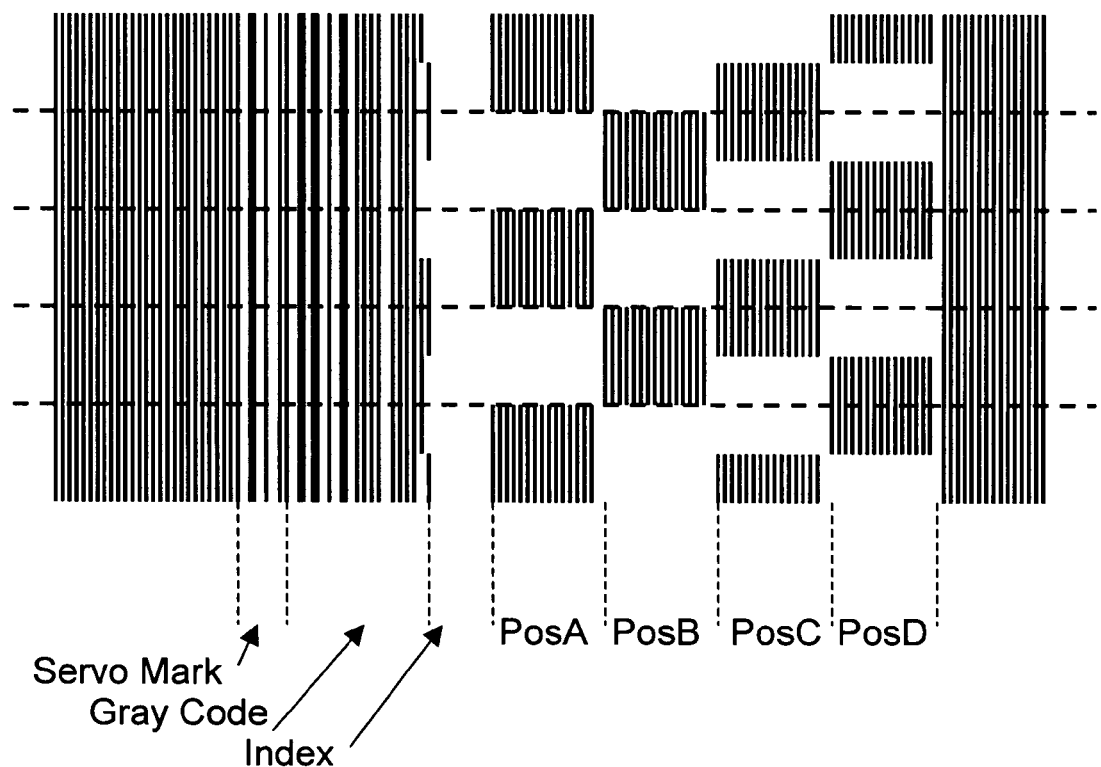
FIG. 3 is a diagram depicting details of the position signals in FIG. 2.
Figure 4:
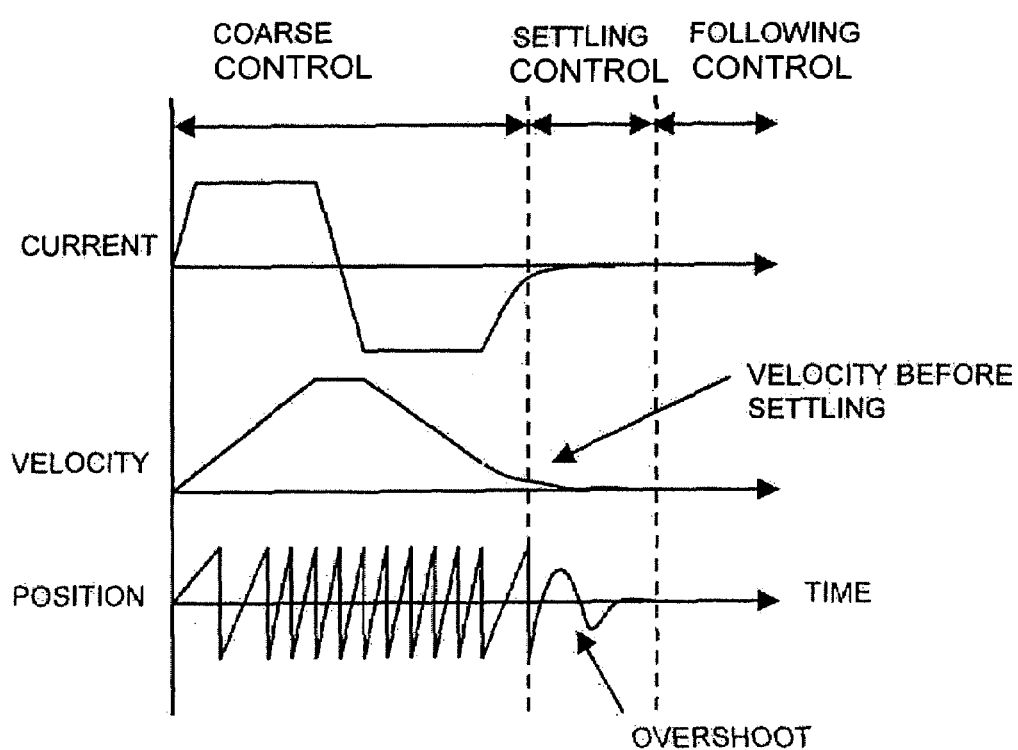
FIG. 4 is a diagram depicting the seek operation of the head in FIG. 1.

FIG. 1 is a block diagram depicting the disk device according to an embodiment of the present invention, FIG. 2 is a diagram depicting the arrangement of the position signals of the magnetic disk in FIG. 1, FIG. 3 is a diagram depicting the configuration of the position signals of the magnetic disk in FIG. 1 and FIG. 2, and FIG. 4 is a diagram depicting the head position control in FIG. 1.

FIG. 1 shows a magnetic disk device as a disk device. As FIG. 1 shows, a magnetic disk 4, which is a magnetic storage medium, is installed at a rotation axis 2 of a spindle motor 5. The spindle motor 5 rotates a magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by a same actuator 1.

The magnetic head 3 has a read element and a write element. The magnetic head 3 is comprised of a read element, including a magneto-resistance (MR) element, stacked on the slider, and a write element, including the write coil, stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1, and drives the VCR 1.

A microcontroller (MCU) 14 detects (demodulates) the current position from the digital position signals from the position detection circuit 7, and calculates the VCH drive instruction value according to the error between the detected current position and the target position. In other words, the microcontroller 14 performs position demodulation and servo control, including disturbance suppression to be described in FIG. 5 and later. A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/reproduces the data. A random access memory (RAM) for the buffer 15 temporarily stores the read data or the write data. The HDC 11 communicates with a host via an interface IF, such as USB (Universal Serial Bus), ATA (Attached AT) and SCSI (Small Computer System Interface). A bus 9 connects these composing elements.

As FIG. 2 shows, on the magnetic disk 4, servo signals (position signals) 16 are arranged in each track in the circumference direction from the outer circumference to the inner circumference with an equal interval. Each track has a plurality of sectors, and the solid lines in FIG. 2 indicate positions where the servo signals (position signals) 16 are recorded. As FIG. 3 shows, the position signal is comprised of a servo mark ServoMark, track number GrayCode, index Index and offset information (servo burst) PosA, PosB, PosC and PosD. The dotted line in FIG. 3 shows the track center.

The position signal in FIG. 3 is read by the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

FIG. 4 shows an example of the seek control of the actuator executed by the MCU 14 in FIG. 1. The MCU 14 confirms the position of the actuator through the position detection circuit 7 in FIG. 1, performs servo computation, and supplies appropriate current to the VCM 1. FIG. 4 shows the transition of the control from the start of seeking when the head 3 is moved from a certain track position to the target track position, the electric current of the actuator 1, the velocity of the actuator (head), and the position of the actuator (head).

In other words, in seek control, the head is moved to the target position through the transition from coarse control, settling control and following control. The coarse control is position control or velocity control, and the settling control and the following control are basically position controls for both of which the current position of the head must be detected.

To confirm the position like this, the servo signals are recorded on the magnetic disk in advance, as mentioned in FIG. 2. In other words, as FIG. 3 shows, servo marks which indicate the start position of the servo signal, gray code which indicates the track number, index signal, and signals PosA to PosD which indicate the offset, are recorded on the magnetic disk in advance. These signals are read by the magnetic head, and these servo signals are converted into digital values by the position detection circuit 7.

First Embodiment of Positioning Control System

Figure 5:
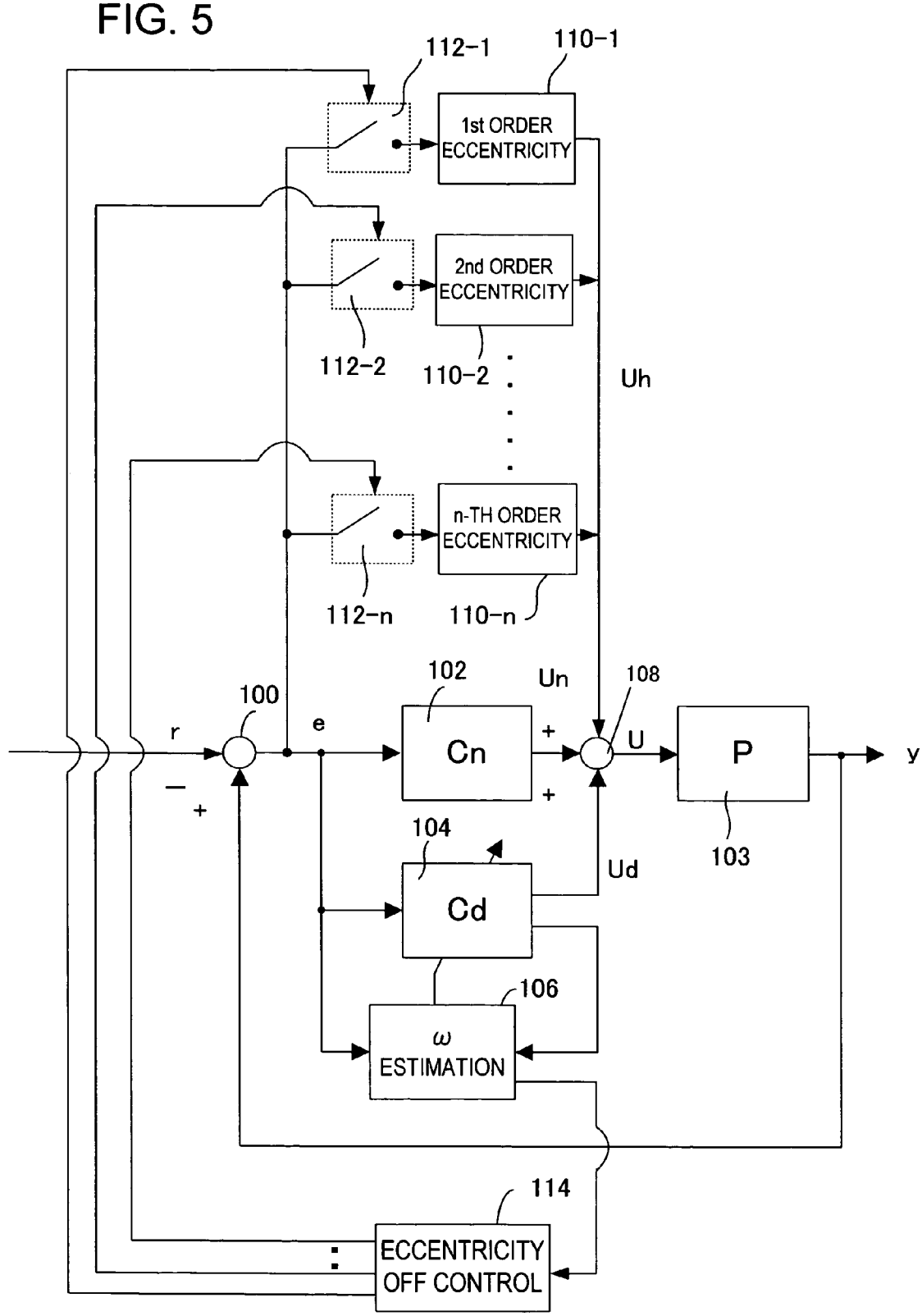
FIG. 5 is a block diagram depicting a positioning control system according to an embodiment of the present invention.

FIG. 5 is a block diagram depicting the first embodiment of the position control system for suppressing disturbance which the MCU 14 in FIG. 1 executes. This position control system is a control system for detecting the eccentricity and disturbance frequency, and suppressing periodic disturbance by adaptive control.

A computing unit 100 computes a position error 'e' between an instructed target position 'r' and an observed position 'y'. This position error 'e' is input to a controller 102 (Cn) which performs feedback control. The controller 102 outputs the control current value Un by a known PID (Proportional Integration Difference) control, PI control+ LeadLag and observer control.

A frequency estimation unit 106 for estimating the frequency of disturbance ($\omega$ estimation), and a compensator (Cd) 104 for suppressing the disturbance of a specific frequency by adaptive control are attached to this controller 102.

Also eccentricity correction blocks 110-1, 110-2, ..., 110-$n$ for compensating the first, second, ... n-th order eccentricity of the disk 4 are installed to the controller 102. Each eccentricity compensation block 110-1, 110-2, ..., 110-$n$ extracts the first-order frequency (e.g. 90 Hz), second-order frequency (e.g. 180 Hz), ..., n-th order frequency (e.g. 90×n Hz) of eccentricity from the position error 'e', and outputs an eccentricity follow up control current value which follows up the eccentricity frequency.

A switch 112-1, 112-2, ..., 112-$n$ to turn ON/OFF the input of the position error 'e' is installed to the input side of each of these eccentricity correction blocks 110-1, 110-2, ..., 110-$n$. Also an eccentricity control OFF control block 114, for receiving a disturbance frequency $\omega$ estimated by the frequency estimation unit ($\omega$ estimate) 106, and for controlling ON/OFF of the switches 112-1, 112-2, ..., 112-$n$ of the eccentricity correction blocks for an eccentricity correction frequency which interferes with this frequency is installed.

A computing unit 108 computes a sum U of an output Un of the controller 102 (Cn), an output Ud of the compensator 104 (Cd), and a sum Uh of the eccentricity follow up control current values of the eccentricity correction blocks 110-1, 110-2, ..., 110-$n$, and supplies the sum to a control target 103 (P) as control current. By this, the position of the head 3, which is the control target 103, driven by the actuator 1, is controlled so as to follow up the eccentricity and disturbance. In other words, the device is vibrated by disturbance, so the position of the head 3 is controlled with respect to the magnetic disk 4 so as to follow up the disturbance, and also the position of the head 3 is controlled so as to follow up the eccentricity of the magnetic disk 4, therefore the positional relationship between the head 3 and the magnetic disk 4 is not changed.

The frequency estimation unit 106 estimates an angular frequency $\omega$ (=$2\pi f$) of the disturbance based on the position error 'e', and introduces this value to a transfer function of the disturbance frequency suppression of the compensator 104. The compensator 104 computes a recurrence formula (adaptive control formula) from the position error 'e' and the estimated angular frequency $\omega$, and computes a compensated current output Ud.

In this way, in order to handle disturbance of an unknown frequency in a certain range, the frequency of disturbance is detected and the unknown frequency is suppressed. For the method for estimating this unknown frequency and suppressing the disturbance of the unknown frequency, a method for assuming a recurrence formula of a sine wave, or another method for using an adaptive rule based on the error signal 'e' and correcting the drive amount of the control target, can be used. Also a method of estimating an unknown frequency based on an error signal 'e', generating a disturbance suppression signal in the position level, correcting the position error signal and inputting it to the controller, can be used.

Figure 6:
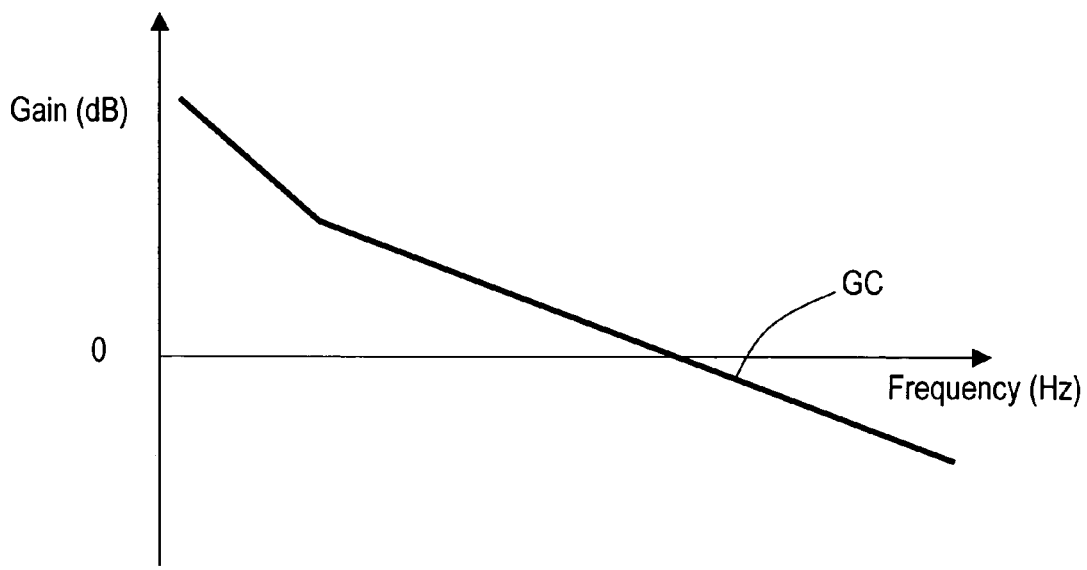
FIG. 6 is a grain characteristic diagram of a controller in FIG. 5.

Now the operation of the positioning control system in FIG. 5 will be described with reference to FIG. 6 to FIG. 13. FIG. 6 is a gain characteristic diagram of an open loop characteristic of the positioning control system which has neither an eccentricity correction nor a disturbance compensation characteristic. In other words, this is a diagram to indicate the gain characteristic GC of the controller 102 when the abscissa is frequency (Hz) and the ordinate is gain (dB).

Figure 7:
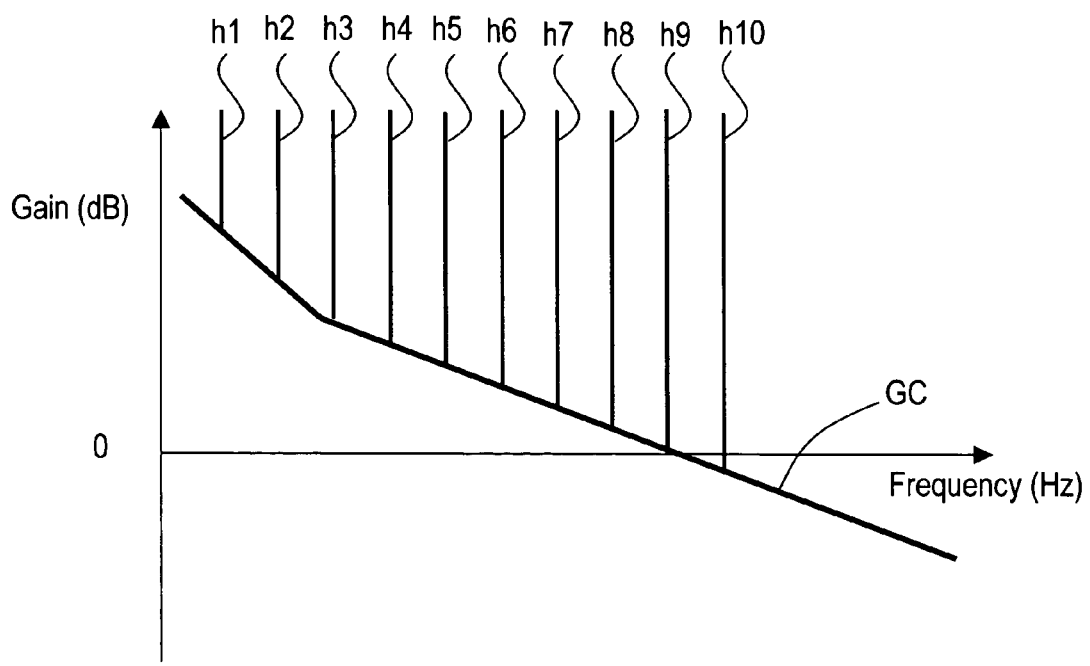
FIG. 7 is a gain characteristic diagram of a controller in which the eccentricity correction function in FIG. 5 is added.

When an eccentricity correction is added to this characteristic, the characteristic in FIG. 6 changes to FIG. 7. That is, a gain characteristic diagram of an open loop characteristic of the positioning control system has an eccentricity correction, but does not have a disturbance compensation characteristic. Here the case when the tenth-order of eccentricity correction is added is shown, and the eccentricity correction is to make gain infinite by a frequency which is an integral multiple of a rotation frequency. Therefore as FIG. 7 shows, the characteristics h1, h2, h3, ..., h10 with which gain is infinite are added to the gain characteristic GC in FIG. 6 using a frequency which is an integral multiple (one times, two times, ...) of the rotation frequency.

Figure 8:
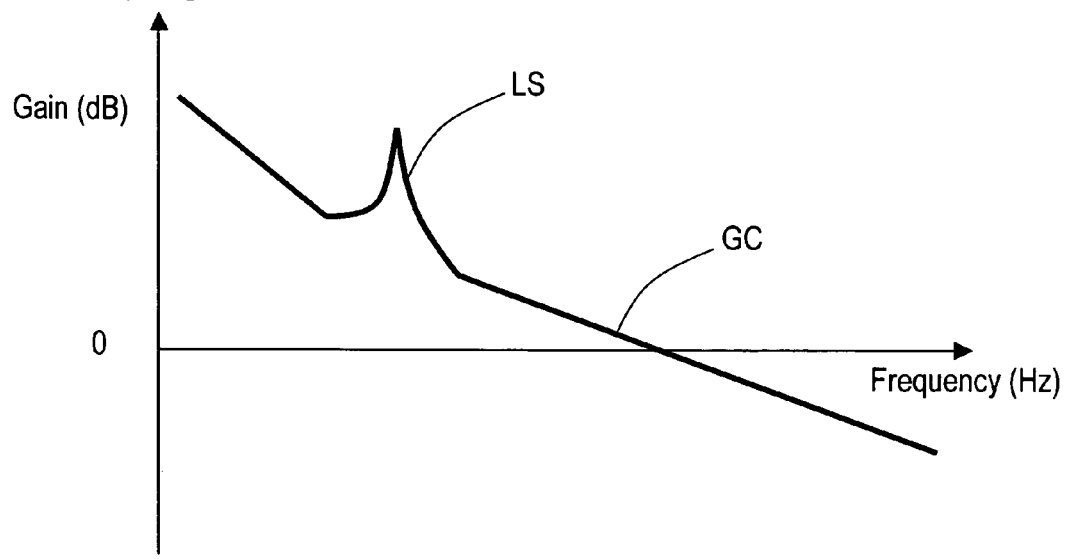
FIG. 8 is a gain characteristic diagram of a controller in which the disturbance suppression function in FIG. 5 is added.

On the other hand, when a notch filter type loop shaping for compensating a disturbance is added to the gain characteristic in FIG. 6, then FIG. 8, which is a gain characteristic diagram of an open loop characteristic of the positioning control system which does not have an eccentricity correction but has a disturbance compensation characteristic, is created. In other words, the disturbance compensation characteristic LS adjusts the frequency which raises the gain according to the setting or to adaptation.

Figure 9:
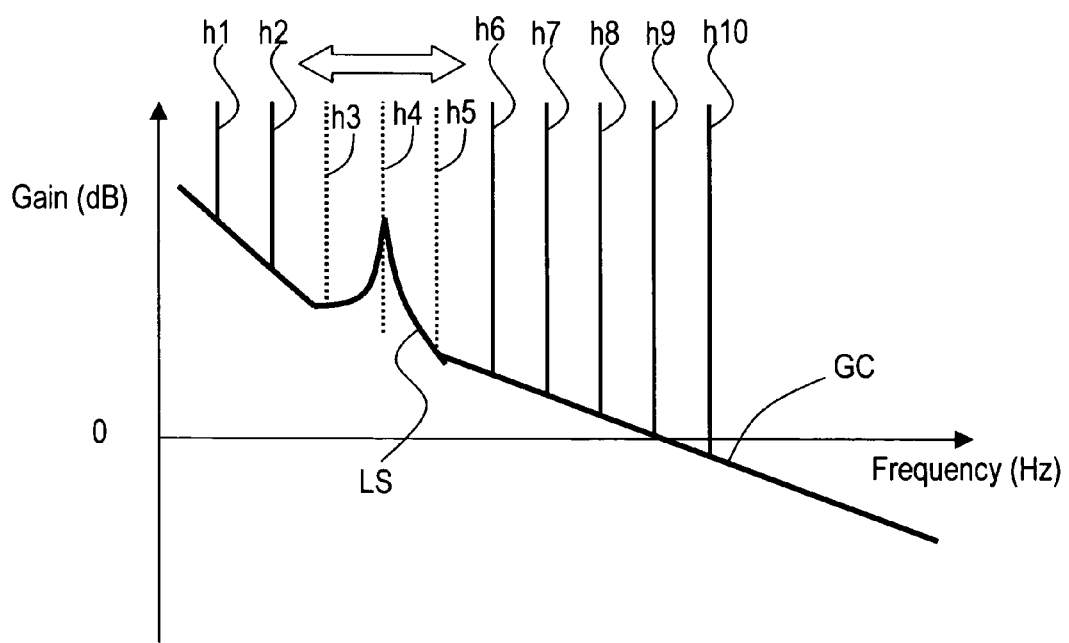
FIG. 9 is a gain characteristic diagram of a controller in which the eccentricity correction function and disturbance suppression function in FIG. 5 are added.

The gain characteristic in FIG. 9 is the gain characteristic in FIG. 7 and the gain characteristic in FIG. 8 superimposed. In other words, FIG. 9 shows the characteristic when the disturbance compensation characteristic LS and the eccentricity correction frequency of the suppression width thereof are overlapped. For example, in FIG. 9, the gain characteristics h3, h4 and h5 of the third-, fourth- and fifth-order eccentricity correction frequencies are overlapped on the disturbance compensation characteristic LS.

Figure 10:
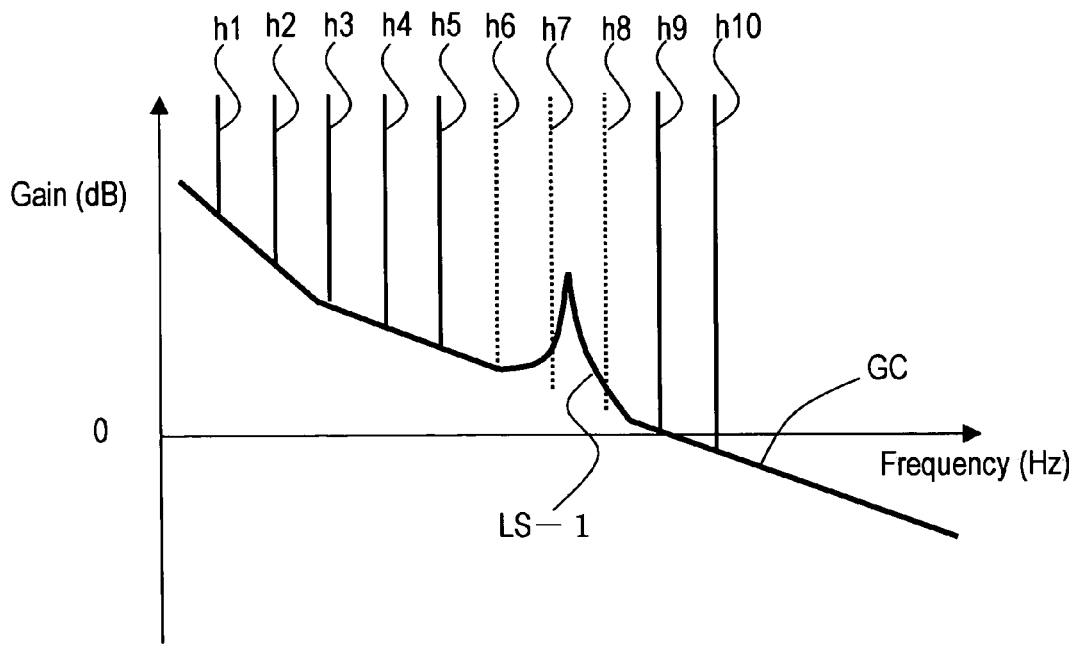
FIG. 10 is a gain characteristic diagram of a controller in which the eccentricity correction function and another disturbance suppression function in FIG. 5 are added.

In the same way, if the disturbance compensation frequency characteristic LS-1 is set or adapted to another frequency range, the gain characteristics h6, h7 and h8 of the sixth-, seventh- and eighth-order eccentricity correction frequencies are overlapped on the disturbance compensation characteristic LS-1, as shown in FIG. 10, just like the case of FIG. 9.

This means that the eccentricity correction and disturbance compensation interfere with each other in the frequency area in this overlapped range. For the eccentricity correction, eccentricity is followed up by making the gain infinite for a specific RRO (Repeatable Run Out) order of frequency. The disturbance frequency, on the other hand, is an unknown frequency for the device, and suppression of the frequency range of the disturbance compensation has a width and does not set the gain to infinite but increases the gain, so the eccentricity correction characteristic follows the disturbance compensation characteristic in the overlapped range.

Therefore this interference makes effective eccentricity correction difficult, and at worse, eccentricity correction may not converge but may diverge. In the present invention, the eccentricity control OFF control block 114 receives the disturbance frequency ω estimated by the frequency estimation unit (ω estimation) 106, and controls ON/OFF of the switches 112-1, 112-2, . . . , 112-n of the eccentricity correction block for the eccentricity correction frequency which interferes with this frequency.

In other words, the feedback switch of the eccentricity control block for an RRO order of eccentricity, for which stabile eccentricity control cannot be expected because of the disturbance compensation frequency, is turned OFF, so as to prevent interference between the eccentricity correction and the disturbance compensation. In the case of the example in FIG. 9, the gain characteristics h3, h4 and h5 of the third-, fourth- and fifth-order eccentricity correction frequencies overlap the disturbance compensation characteristic LS, so the feedback switches 112-3, 112-4 and 112-5 of the third-, fourth- and fifth-order eccentricity correction blocks 110-3, 110-4 and 110-5 are turned OFF. And the third-, fourth- and fifth-order eccentricity correction blocks 110-3, 110-4 and 110-5 output the eccentricity correction current values before being turned OFF.

In the same way, in the case of the example in FIG. 10, the disturbance compensation frequency characteristic LS-1 is overlapped on the gain characteristics h6, h7 and h8 of the sixth-, seventh- and eighth-order eccentricity correction frequencies, so the feedback switches 112-6, 112-7 and 112-8 of the sixth-, seventh- and eighth-order eccentricity correction blocks 110-6, 110-7 and 110-8 are turned OFF. And the sixth, seventh and eighth order eccentricity correction blocks 110-6, 110-7 and 110-8 output the eccentricity correction current values before being turned OFF.

Figure 11:
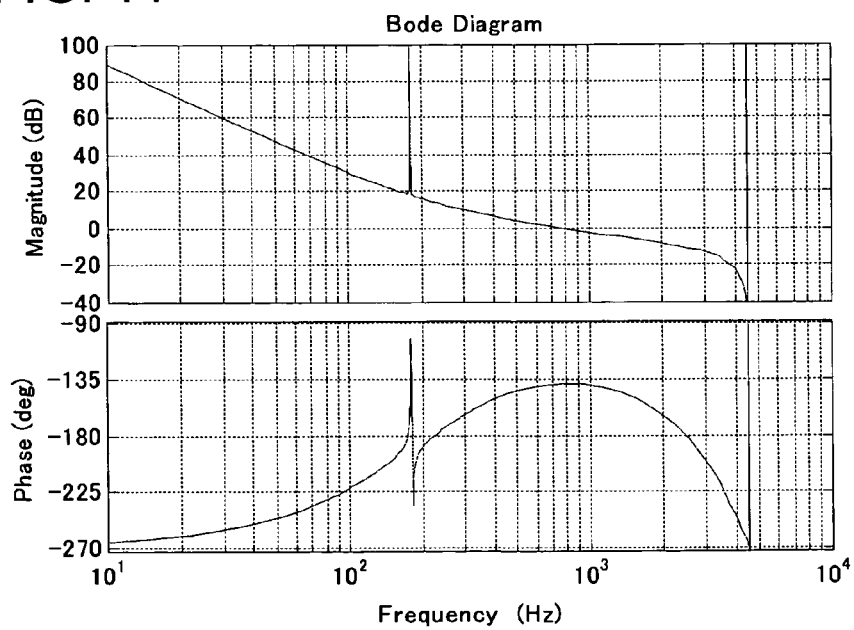
FIG. 11 is frequency characteristic diagrams of a controller having the eccentricity correction function in FIG. 5.
Figure 12:
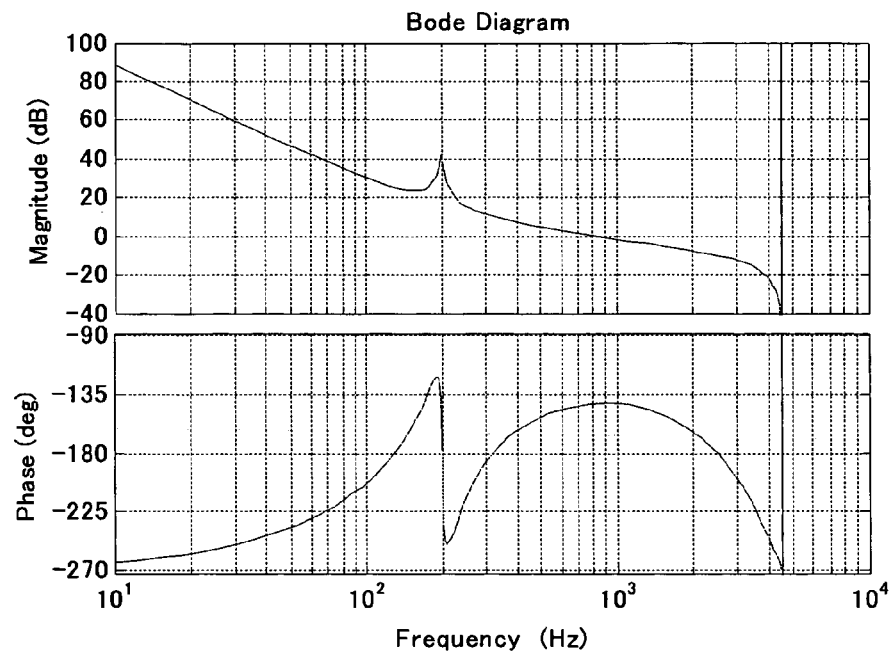
FIG. 12 is frequency characteristic diagrams of a controller having the disturbance suppression function in FIG. 5.
Figure 13:
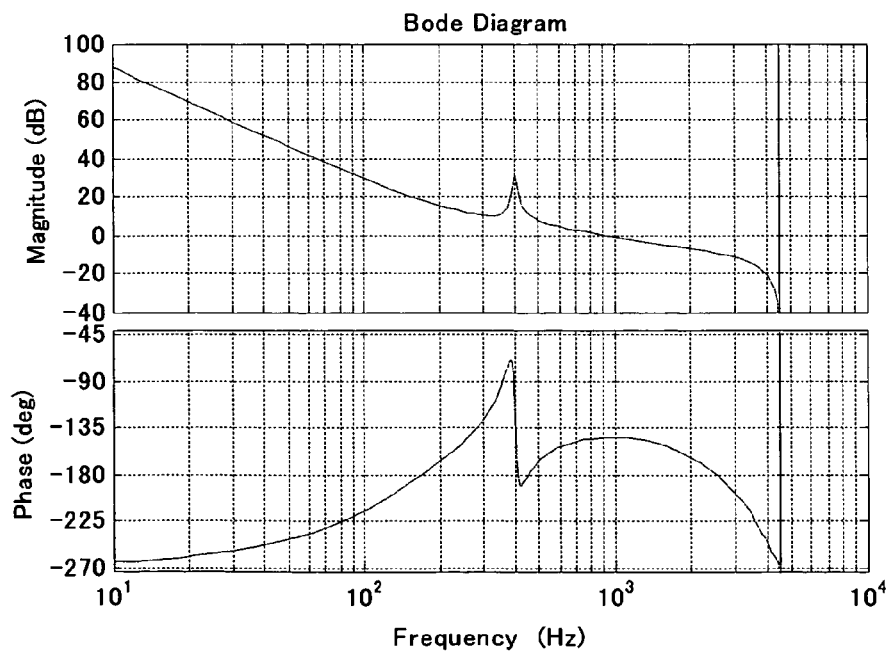
FIG. 13 is frequency characteristic diagrams of a controller having another disturbance suppression function in FIG. 5.

The phase change also becomes a problem. FIG. 11 shows a Bode diagram (top) of frequency (Hz) vs. gain(db) and a Bode diagram (bottom) of frequency (Hz) vs. phase (deg) in the case of a second-order (180 Hz) RRO correction. FIG. 12 shows a Bode diagram (top) of frequency (Hz) vs. gain (dB), and a Bode diagram (bottom) of frequency (Hz) vs. phase (deg) in the case when 200 Hz of disturbance is suppressed. FIG. 13 shows a Bode diagram (top) of frequency (Hz) vs. gain (dB) and a Bode diagram (bottom) of frequency (Hz) vs. phase (deg) in the case when 400 Hz of disturbance is suppressed.

In the phase characteristics in FIG. 12 and FIG. 13, the phase near the eccentricity correction frequency 180 Hz in FIG. 11 is "−135 deg" in FIG. 12 and "−180 deg" in FIG. 13, which means that the phase change is 50 degrees.

In the case of the 200 Hz suppression in FIG. 12, the phase change is large since the distribution frequency is closer to the eccentricity correction frequency 180 Hz in FIG. 11. Therefore in order to prevent the influence of this phase change, turning OFF the eccentricity control for an eccentricity frequency near the disturbance suppression frequency is effective.

This eccentricity control OFF control section 114 receives an estimated disturbance frequency ω (=2πf) from the frequency estimation unit 106, and turns OFF the control of three eccentricity correction frequencies near the estimated disturbance frequency, in this case. Here three frequencies near the estimated disturbance frequency are turned OFF, but one, two or four frequencies, for example, may be turned OFF depending on the profile of the frequency characteristic of the disturbance suppression.

In this way, when a plurality of orders of eccentricity correction is performed, the disturbance suppression frequency is detected, and the feedback of eccentricity correction control of the eccentricity correction frequency near the disturbance suppression frequency is turned OFF, so the interference between the eccentricity correction and the disturbance suppression can be prevented, and unstable eccentricity correction can be prevented. In other words, interference is prevented because preventing unstable eccentricity correction is more critical for the positioning control system than the accuracy of the eccentricity correction.

Configuration of Observer of First Embodiment

Figure 14:
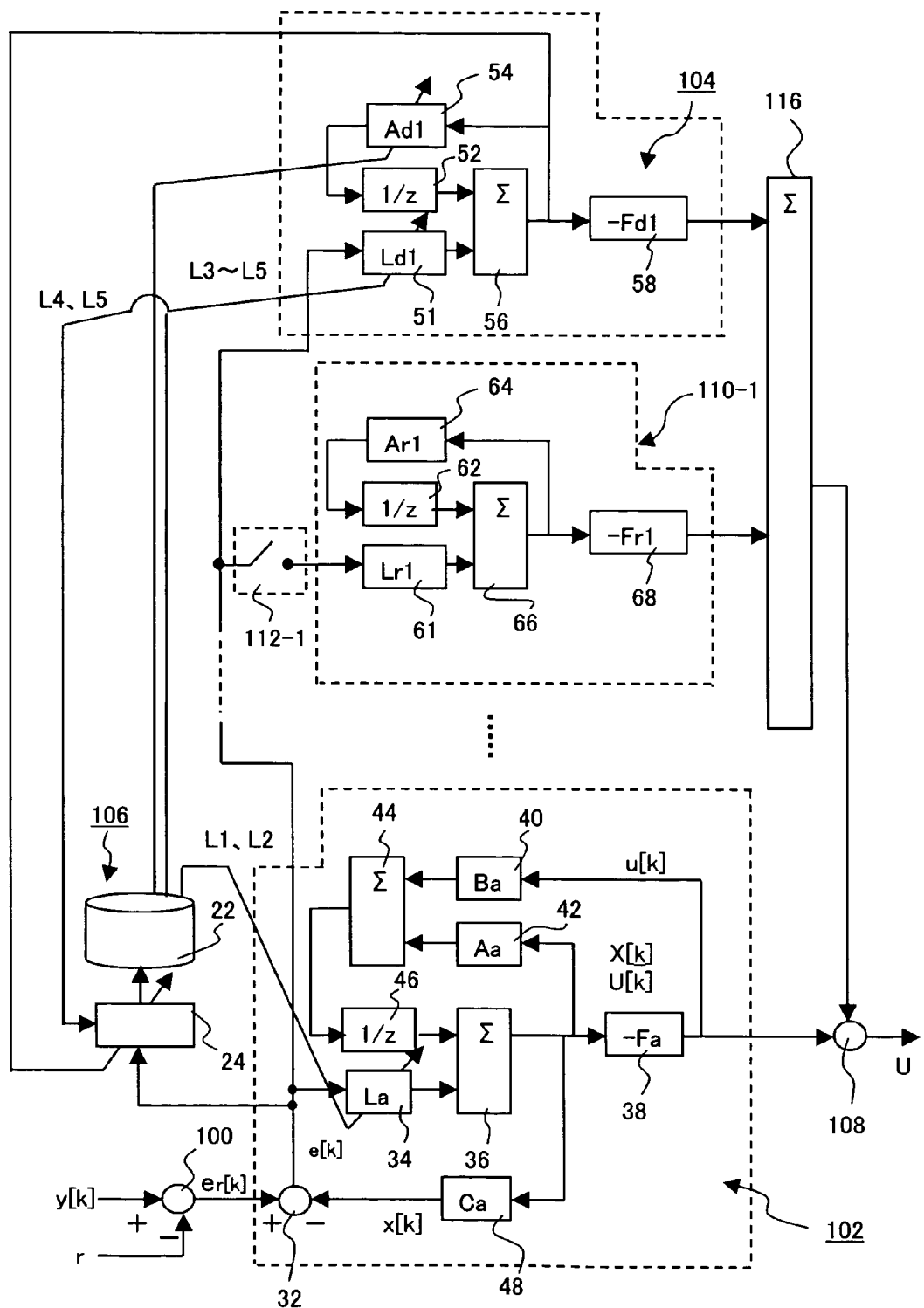
FIG. 14 is a block diagram depicting the positioning control system in FIG. 5 comprised of an observer.

FIG. 14 is a block diagram depicting the positioning control system of the first embodiment of the present invention in FIG. 5, which is comprised of a current observer. The current observer is shown by the following Expressions (1), (2) and (3).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix}(y(k) - x(k)) \quad (1)$$

$$u(k) = -\begin{pmatrix} F1 & F2 & F3 & F4 & F5 \end{pmatrix} \begin{pmatrix} x(k) \\ v(k) \\ b(k) \\ z1(k) \\ z2(k) \end{pmatrix} \quad (2)$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix} \begin{pmatrix} x(k) \\ v(k) \\ b(k) \\ z1(k) \\ z2(k) \end{pmatrix} + \frac{Bl}{m}\frac{1}{Lp}T^2 \begin{pmatrix} 1/2 \\ 1 \\ 0 \\ 0 \\ 0 \end{pmatrix} u(k) \quad (3)$$

In the current observer, a model of the controller and a model of the disturbance are integrated. The model of the disturbance is designed separately from the model of the controller because the configuration in which the disturbance model is separated is preferable. In other words, the current observer shown in FIG. 14 is an observer shown by the above Expression (1) and the following Expressions (4), (5), (6) and (7).

$$u(k) = -\begin{pmatrix} F1 & F2 \end{pmatrix} \begin{pmatrix} x(k) \\ v(k) \end{pmatrix} \quad (4)$$

$$uout(k) = u(k) - \begin{pmatrix} F3 & F4 & F5 \end{pmatrix} \begin{pmatrix} b(k) \\ z1(k) \\ z2(k) \end{pmatrix} \quad (5)$$

$$\begin{pmatrix} x(k+1) \\ v(k+1) \end{pmatrix} = \begin{pmatrix} 1 & 1 \\ 0 & 1 \end{pmatrix}\begin{pmatrix} x(k) \\ v(k) \end{pmatrix} + \frac{Bl}{m}\frac{1}{Lp}T^2\begin{pmatrix} 1/2 \\ 1 \end{pmatrix} u(k) \quad (6)$$

$$b(k+1) = b(k)$$

$$\begin{pmatrix} z1(k+1) \\ z2(k+1) \end{pmatrix} = \begin{pmatrix} a11 & a12 \\ a21 & a22 \end{pmatrix}\begin{pmatrix} z1(k) \\ z2(k) \end{pmatrix} \quad (7)$$

By correcting the model of the observer when the analog control system is converted into a digital control system, a configuration where the disturbance is separated can be implemented, as shown in Expressions (4), (5), (6) and (7).

In FIG. 14, composing elements the same as FIG. 5 are denoted with the same reference symbols, and just like FIG. 5, the first computing block 100 computes the actual position error er[k] by subtracting the target position 'r' from the observed position y[k] acquired by demodulating the servo information read by the head 3. This actual position error is input to the model of the controller 102.

In the model of the controller 102, the second computing block 32 computes the estimated position error e[k] by subtracting between the estimated position x[k] of the observer from the actual position error er[k].

This estimated position error e[k] is input to the state estimation block 34, and the estimated correction value (right hand side of Expression (1)) is computed using the estimated gain La (L1, L2). And this value is added with the state quantity (left hand side of Expression (1)) from the delay block 46 in the addition block 36, and the estimated position x[k] and the estimated velocity v[k] are acquired, as shown in Expression (1).

The estimated values x[k] and v[k] are multiplied by the state feedback gain (−Fa=F1, F2) in the fourth computing block 38, and the first drive value u[k] of the actuator 1 is acquired, as shown in Expression (4). On the other hand, the estimated values x[k] and v[k] in Expression (1) from the addition block 36 are multiplied by the estimated gain Aa (2×2 matrix (1, 0) in Expression (6)) in the fifth computing block 42, and the drive value u[k] of the fourth computing block 38 is multiplied by the estimated gain Ba (a value by which u[k] is multiplied in Expression (6)) in the sixth computing block 40. These multiplication results are added in the addition block 44, and the estimated state quantities x[k+1] and v[k+1] of the next sample in Expression (6) are acquired.

The estimated state quantity of this next sample is input to the delay block 46, as mentioned above, and corrected by the estimated correction value of the state estimation block 34. For the estimated value of Expression (1) from the addition block 36, the estimated position x[k] is acquired in the seventh computing block 48, and is input to the above mentioned second computing block 32.

The estimated position error e[k] is input to the disturbance compensator 104. In the disturbance compensator 104, the state estimation block 51 computes the estimated correction value (right hand side of Expression (1)) using the estimated gain Ld1 (L3, L4, L5) for the estimated position error e[k]. And this value is added with the state quantity (left hand side of Expression (1)) from the delay block 52 in the addition block 56, and the estimated disturbance suppression values b[k], z1[k] and z2[k] are acquired, as shown in Expression (1).

The estimated values b[k], z1[k] and z2[k] are multiplied by the state feedback gain (Fd1=F3, F4, F5) in the eighth computing block 58, and the disturbance suppression drive value of the actuator 1 is acquired, as shown in Expression (5). On the other hand, the estimated values b[k], z1[k] and z2[k] of Expression (1) from the addition block 56 are multiplied by the estimated gain Ad1 (gain of b[k] in Expression (7) and the gain of 2×2 matrix A) in the ninth computing block 54, and are input to the delay block 52, and the estimated values b[k+1], z1[k+2] and z2[k+1] of the next sample are acquired.

The eccentricity control blocks 110-1, 110-2, . . . , 110-n are also comprised of the same observer as the disturbance compensator 104. In the eccentricity control block 110-1, the state estimation block 61 computes the eccentricity estimation correction value (right hand side of Expression (1)) in the same way using the estimated gain Lr1 (L6, L7) of the eccentricity for the estimated position error e[k]. And this value is added with the state quantity (left hand side of Expression (1)) from the delay block 62 in the addition block 66, and the estimated eccentricity suppression values zh1[k] and zh2[k] are acquired, as shown in Expression (1).

The estimated values zh1[k] and zh2[k] are multiplied by the state feedback gain (Fr1) in the tenth computing block 68, and the eccentricity follow up drive value of the actuator 1 is acquired, as shown in Expression (5). On the other hand, the estimated values zh1[k] and zh2[k] of Expression (1) from the addition block 66 are multiplied by the estimated gain Ar1 (gain of 2×2 matrix A in Expression (7)) in the eleventh computing block 64, and are input to the delay block 62, and the estimated values zh1[k+1] and zh2[k+1] of the next sample are acquired.

The other eccentricity control blocks 110-1, 110-3, . . . , 110-n have the same configuration as the eccentricity control block 110-1, where only the estimated gain is different.

The disturbance addition block 116 adds the disturbance suppression control value of the disturbance compensator 104 and the eccentricity follow up control value of each eccentricity correction block 110-1, 110-2, . . . , 110-n. And the addition block 108 subtracts the output value of the disturbance addition block 116 from the drive value u[k], and outputs the output drive value uout[k] of Expression (5).

In other words, Expressions (2) and (3) and Expressions (4), (5), (6) and (7) are compared, and the gain indicated by the matrix in Expression (3) is separated into the controller model and the disturbance model, and is developed into Expressions (6) and (7), and the gain F of Expression (2) is separated into the controller model and the disturbance model, and is developed into Expressions (4) and (5). Expression (1) has the same form, but is computed in different blocks 34 and 51 according to the developed expressions.

The disturbance adaptive control system ($\omega$ estimation unit) 106 is integrated into this observer. The adaptive control system 106 for disturbance suppression has a $\omega$ estimation unit 24 for estimating a disturbance frequency according to the adaptive rule and a table 22 for storing the estimated gains L and A according to the estimated frequency (angular frequency $\omega$ in this case). The $\omega$ estimation unit 24 computes the estimated angular frequency $\omega1[k]$ from the estimated position error e[k] according to the following adaptive formula (8).

$$\omega1[k] = \omega1[k-1] + Ka \cdot \frac{L5 \cdot z1[k] - L4 \cdot z2[k]}{z1[k]^2 + z2[k]^2} e[k]. \quad (8)$$

This adaptive formula is an integration type for correcting the estimated angular frequency $\omega1[k-1]$ of a previous sample adaptively using the estimated disturbance gains L4 and L5, estimated disturbance values z1[k] and z2[k] of the disturbance compensator 104, and estimated position error e[k]. Ka is a predetermined gain.

Figures 15, 16:
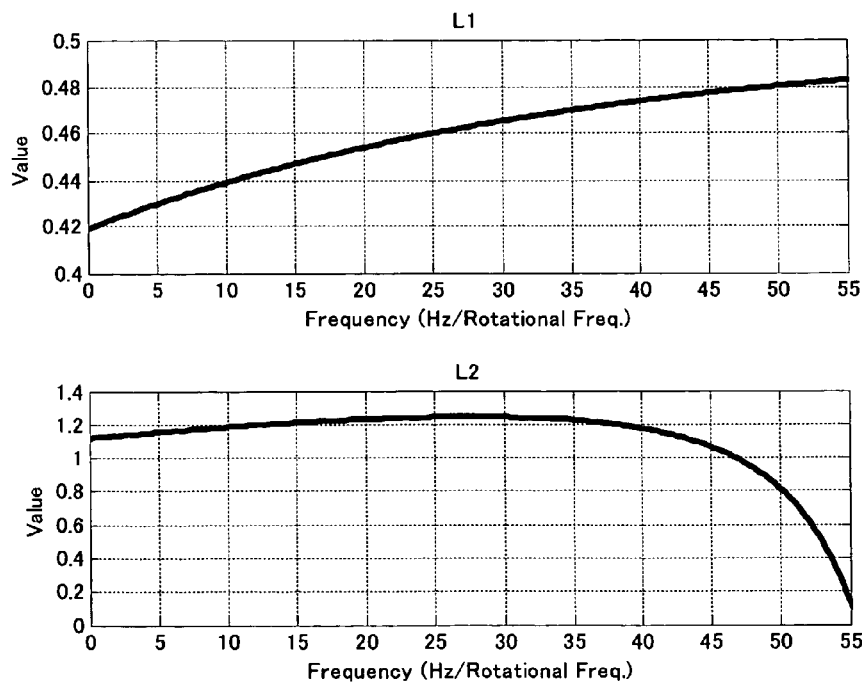
FIG. 15 shows the estimated gain table in FIG. 14.
FIG. 16 is characteristic diagrams of the estimated gains L1 and L2 in FIG. 15.

The table 22, on the other hand, stores the values L1, L2, L3, L4 and L5 and Ad1 (a11, a12, a21 and a22 of Expression (7)) according to the value of each estimated angular frequency $\omega$, as shown in FIG. 15. L1 and L2 of the state estimation block 34 are changed by L1 and L2 of this table 22, and L3, L4 and L5 of the state estimation block 51 are changed by L3, L4 and L5 of the table 22 according to the estimated angular frequency.

Also by a11, a12, a21 and a22 of this table 22, a11, a12, a21 and a22 (see Expression (7)) of the fifth computing block 42 of the disturbance compensator 104 are changed according to the estimated angular frequency.

In other words, according to the disturbance (angular) frequency $\omega$, the disturbance model and the estimated gain of the controller model are changed without changing the state feedback gain F. Here in the estimated gains of the observer, not only the disturbance model for notch filter type shaping, but also all other estimated gains are influenced. In other words, if the disturbance frequency ω or the disturbance model is changed, not only the estimated disturbance gains L4 and L5 of Expression (1), but also all of the position, velocity and bias gains L1, L2 and L3 are influenced.

Figure 19:
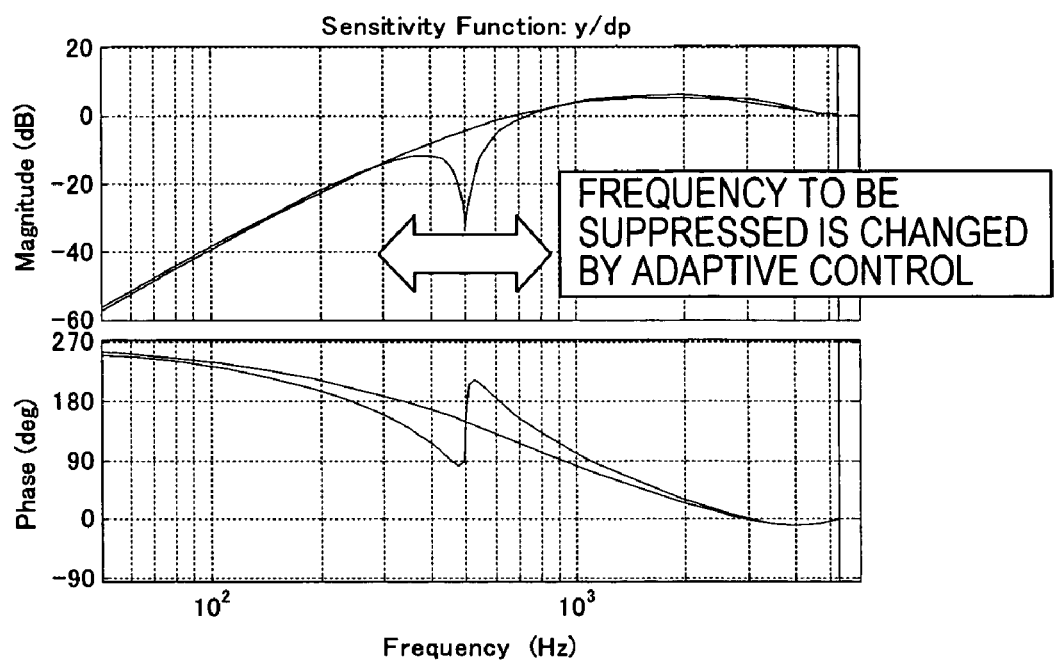
FIG. 19 is characteristic diagrams of the sensitivity function in FIG. 15.

Particularly if the value $\zeta 2$ is large in the pole allocation when the disturbance model is designed in the form of a shaping filter (described later in FIG. 19), that is, if the width of the notch filter type suppression range is wide in frequency characteristic, this influence is high, as described in FIG. 19. Therefore it is necessary to change all the estimated gains from the estimated gains L1 to L5 according to the disturbance frequency.

The values of the estimated gains are computed by the pole allocation method, and stored in the table 22 in advance. This will be described with reference to FIG. 15 to FIG. 18. FIG. 15 shows the value stored in the table 22, FIG. 16 and FIG. 17 are graphs of the estimated gains L1, 12, L3, L4 and L5, and FIG. 18 is a graph of the disturbance model values a11, a12, a21 and a22.

Figure 17:
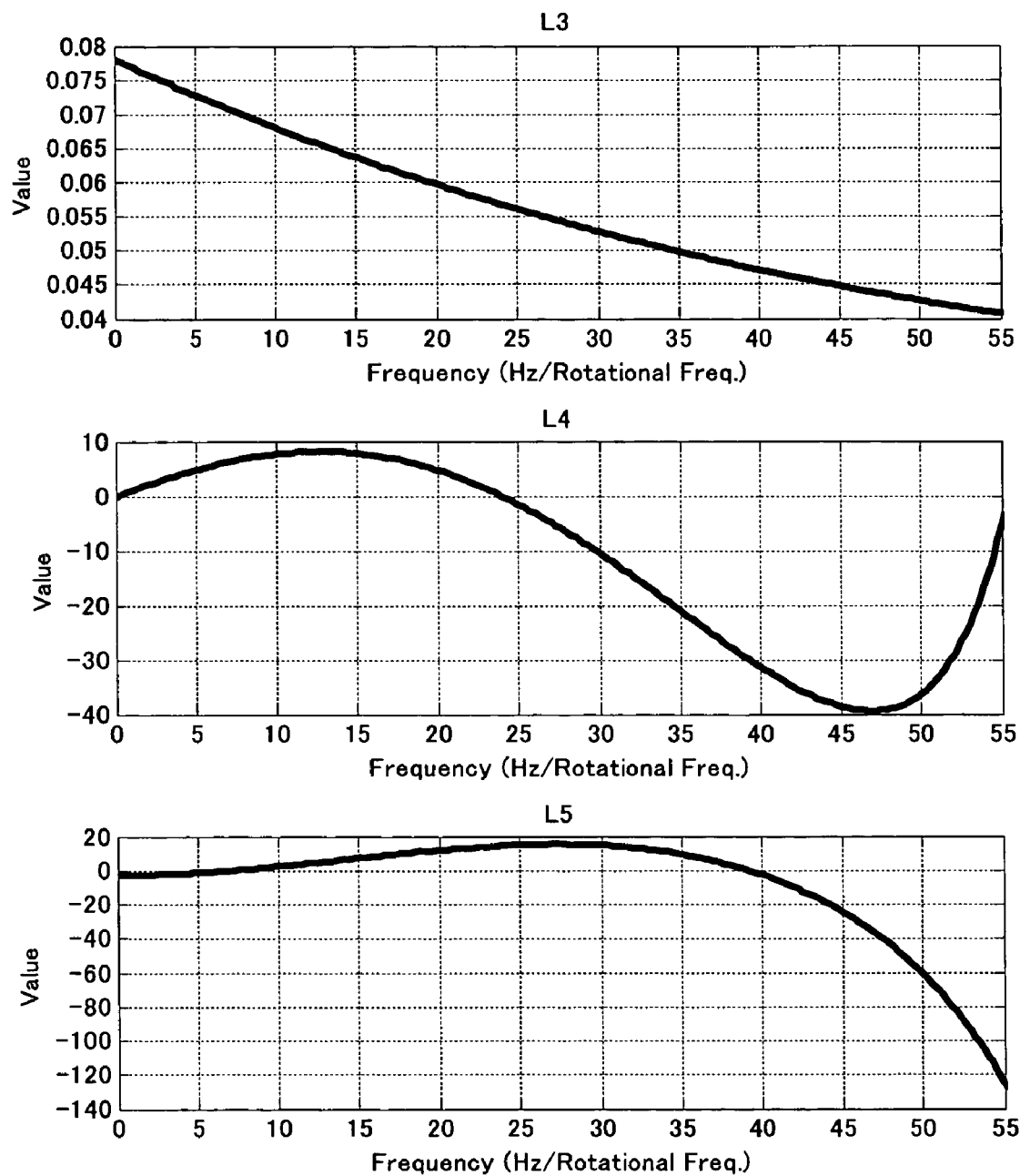
FIG. 17 is characteristic diagrams of the estimated gains L3, L4 and L5 in FIG. 15.
Figure 18:
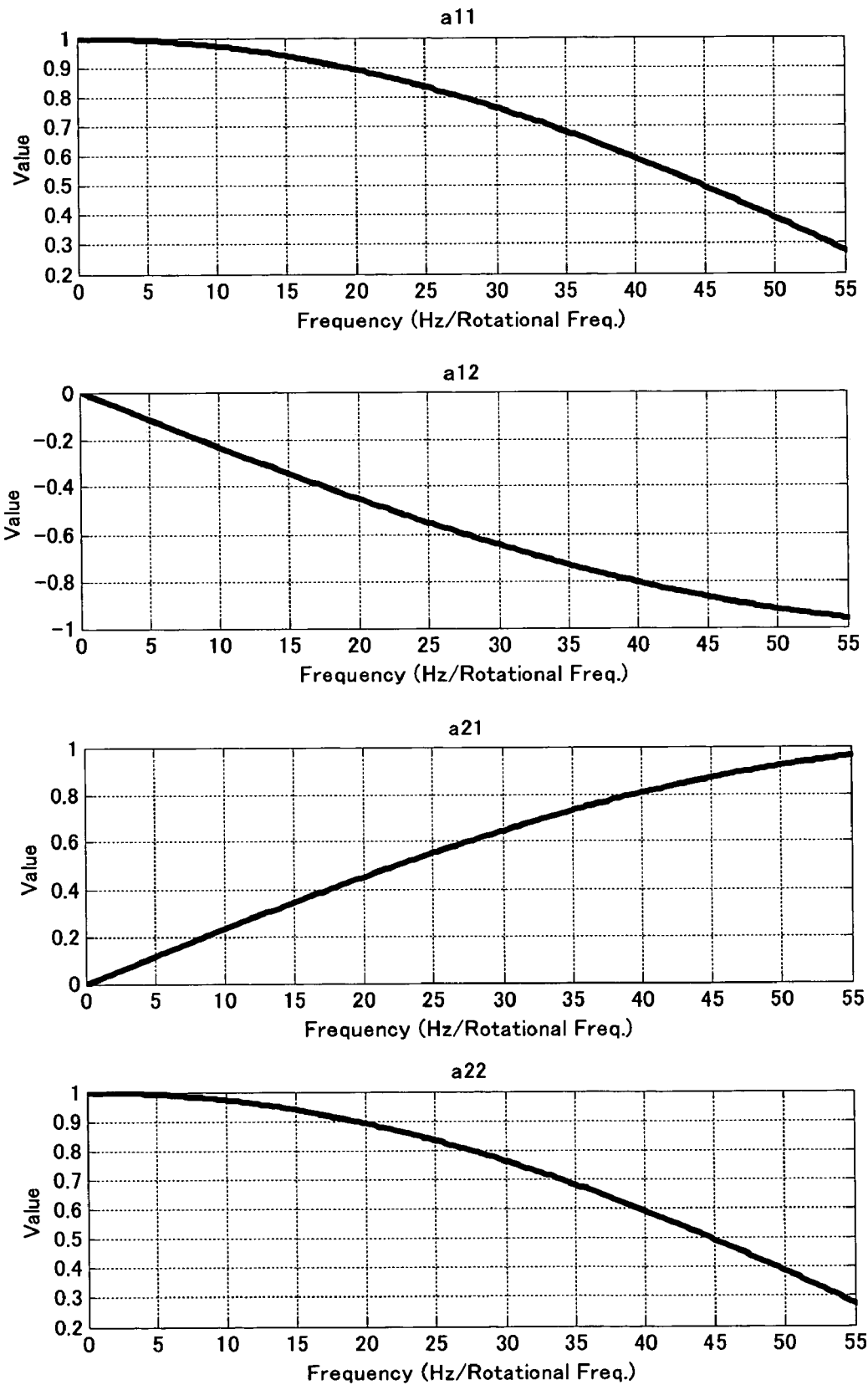
FIG. 18 is characteristic diagrams of the estimated gains a11, a12, a21 and a22 in FIG. 15.

In FIG. 16 and FIG. 17, the abscissa is a frequency when the disturbance frequency is divided by the rotational frequency of the disk, so as to be normalized, and the ordinate is a value of the estimated gains L1, L2, L3, L4 and L5. In FIG. 18, the abscissa is a frequency when the disturbance frequency is divided by the rotational frequency of the disk, so as to be normalized, and the ordinate is a value of the disturbance model values a11, a12, a21 and a22.

As the sensitivity function characteristics in FIG. 19 show, the central frequency of the notch filter type suppression characteristics is sequentially changed by adaptive control. The top graph in FIG. 19 shows the characteristics of frequency vs. magnitude (gain), and the bottom graph in FIG. 19 shows the characteristics of frequency vs. phase. In other words, the frequency to be suppressed is controlled by adaptive control according to the disturbance frequency that fluctuates.

FIG. 15 shows an estimated gain table 22 which corresponds to one disturbance frequency fluctuation. In this case, all the estimated gains of the observer must be corrected, as mentioned above. For this, the estimated gain is stored in the table in advance for each disturbance frequency shown in FIG. 16 and FIG. 18.

However an infinite number of values cannot be held in the table 22, so the disturbance frequency values are stored at every predetermined frequency. The disturbance frequencies there between are interpolated. For example, in FIG. 15, the values are stored at every frequency, which is an integral multiple of the rotational angular frequency.

To remove the offset, it is preferable to change the adaptive rule used for the X estimation, not to the integral rule in Expression (8) but to the adaptive rule of integration+ double-integration shown in the following Expression (9).

$$E[k] = \frac{L5 \cdot z1[k] - L4 \cdot z2[k]}{z1[k]^2 + z2[k]^2} e[k] \quad (9)$$

$$z3[k] = z3[k-1] + E[k]$$

$$\omega 1[k] = \omega 1[k-1] + Ka \cdot E[k] + Kb \cdot z3[k].$$

In Expression (9), E[k] is calculated by the estimated disturbance gains L4 and L5, estimated disturbance values z1[k] and z2[k], and estimated position error e[k], z3[k] is calculated by E[k] and z3[k−1] of the previous sample, and ω1[k] is determined by adding E[k] and z3[k] to ω1[k−1] of the previous sample. In other words, this is an adaptive rule of integration by E[k] and double-integration by z3[k]. Ka and Kb are the predetermined gains. Offset is removed by adding this double-integration.

If an attached controller for disturbance suppression is used while maintaining the original characteristics of the controller, the width of the suppression range of disturbance cannot help becoming narrow. In other words, even if the conventional adaptive control is changed, the adaptive gain cannot help becoming small, which deteriorates the follow up performance to the Chirp Signal. In the present embodiment, the characteristics of the controller are also changed, so the disturbance suppression width can be increased.

Also in the present embodiment, only the estimated gain L of the observer is changed without changing the state feedback gain F. As mentioned above, this configuration is preferable to maintain the pole allocation of the controller. Therefore even if a high adaptive gain is set, follow up is possible without disturbance.

In this way, by constructing the positioning control system using the observer, the characteristics of the controller, disturbance compensator and eccentricity correction block can be designed easily.

Second Embodiment of Position Control System

Figure 20:
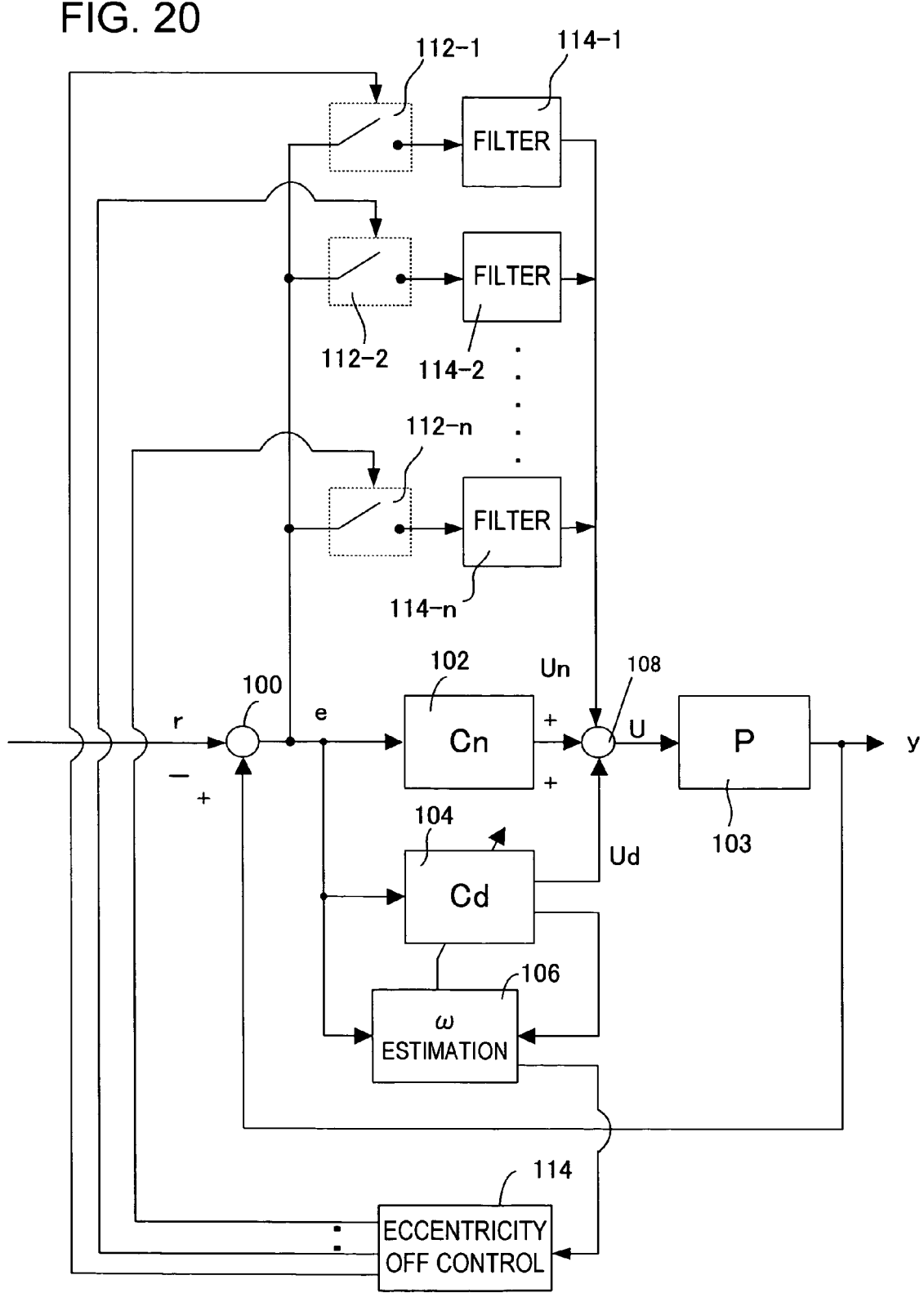
FIG. 20 is a block diagram depicting the positioning control system according to the second embodiment of the present invention.

FIG. 20 is a block diagram depicting the second embodiment of the positioning control system of the present invention. In FIG. 20, composing elements the same as FIG. 5 are denoted with the same reference symbols. In the present embodiment, the first, second, third, . . . , n-th order eccentricity correction blocks are constructed by the filters 114-1, 114-2, . . . , 114-n. By setting the band pass characteristic of the filter for the first, second, third, . . . , n-th order eccentricity frequency, the eccentricity correction block can also be constructed by the filter.

In this case, the controller 102 and the disturbance compensator 104 can be constructed by the adaptive control system using the observer in FIG. 14. The eccentricity correction, however, is not adaptive-controlled.

Third Embodiment of Position Control System

Figure 21:
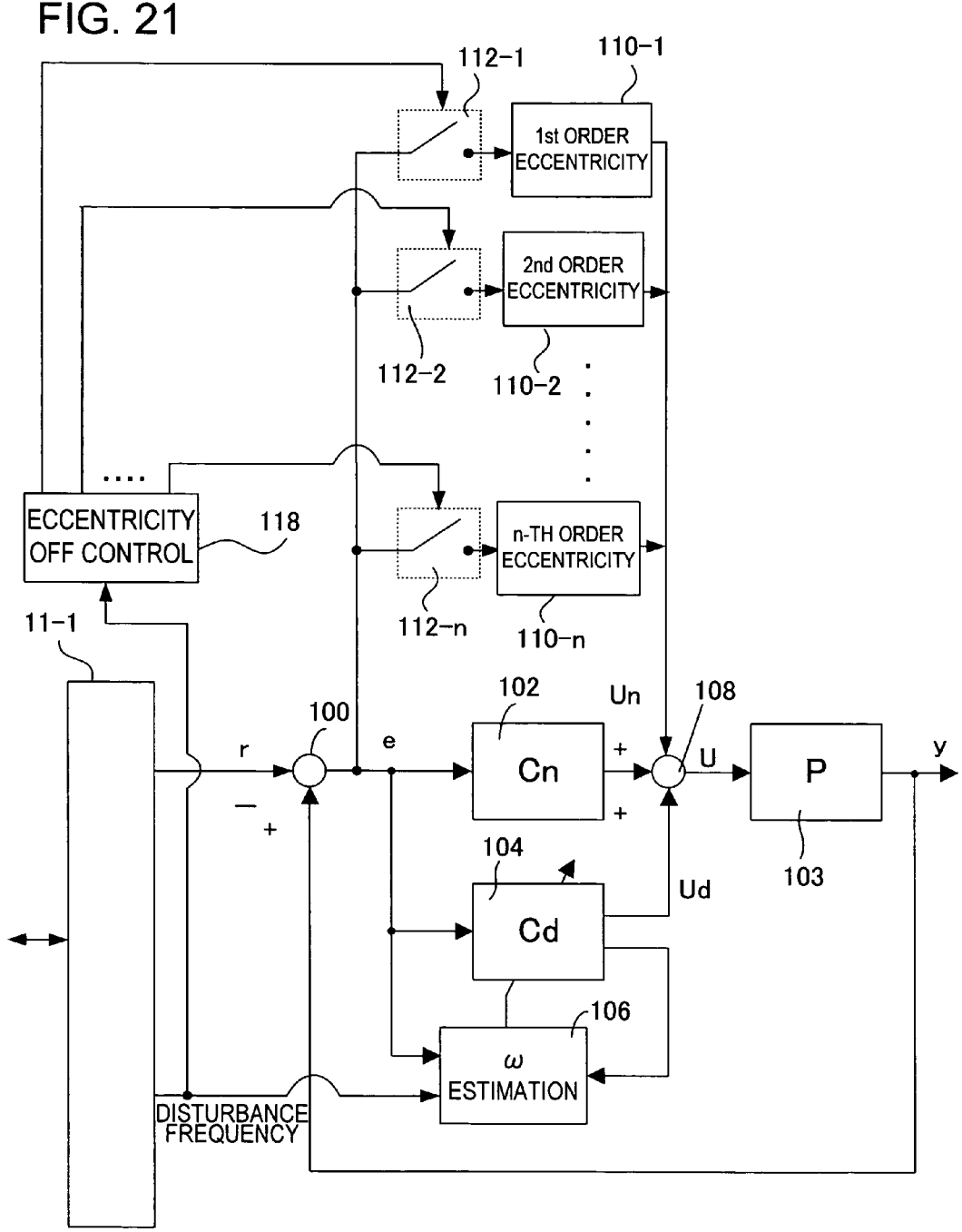
FIG. 21 is a block diagram depicting the positioning control system according to the third embodiment of the present invention.

FIG. 21 is a block diagram depicting the third embodiment of the position control system of the present invention. In FIG. 21, composing elements the same as FIG. 5 are denoted with the same reference symbols. In the present embodiment, an interface circuit 11-1 (embedded in HDC 11) receives a target position 'r' and a disturbance suppression frequency from the outside, and sets the disturbance suppression frequency in the frequency estimation unit 106 as an initial value (initial value of angular frequency of disturbance) of the frequency estimation unit 106. Therefore in the compensator 104, adaptive control is performed from this initial value.

Normally the initial value of the frequency estimation unit 106 is set at the center of the follow up range, since it is assumed that the disturbance frequency is unknown, and the estimated frequency gradually reaches to the disturbance frequency according to the position error 'e'. But in this embodiment, a known disturbance frequency is set as an initial value, so the estimated frequency starts directly from the known disturbance frequency and follows up, even if the actual frequency changes there after.

And the eccentricity OFF control block 118 receives this disturbance suppression frequency, and turns OFF the switches 112-1, 112-2, . . . , 112-n for correcting the eccentricity frequency near this disturbance suppression frequency out of the first, second, third, . . . , n-th order eccentricity correction blocks 110-1, 110-2, . . . , 110-n.

A case when setting a disturbance suppression frequency from the outside is effective, for example, in a case when a disk drive manufacturer provides a disk drive to a set manufacturer, and the set manufacturer installs the disk drive in a personal computer or a home electronic equipment.

In such a case, the disk drive manufacturer does not know the vibration environment which the disk drive will be subject to, and the vibration environment will be determined in relation to the installation method by the set manufacturer and other units to be installed with the disk drive. Therefore the present embodiment is effective when the set manufacturer measures the disturbance frequency which the disk drive will receive after installing the disk drive in the device, and this disturbance frequency is set from the outside when necessary.

Fourth Embodiment of Position Control System

Figure 22:
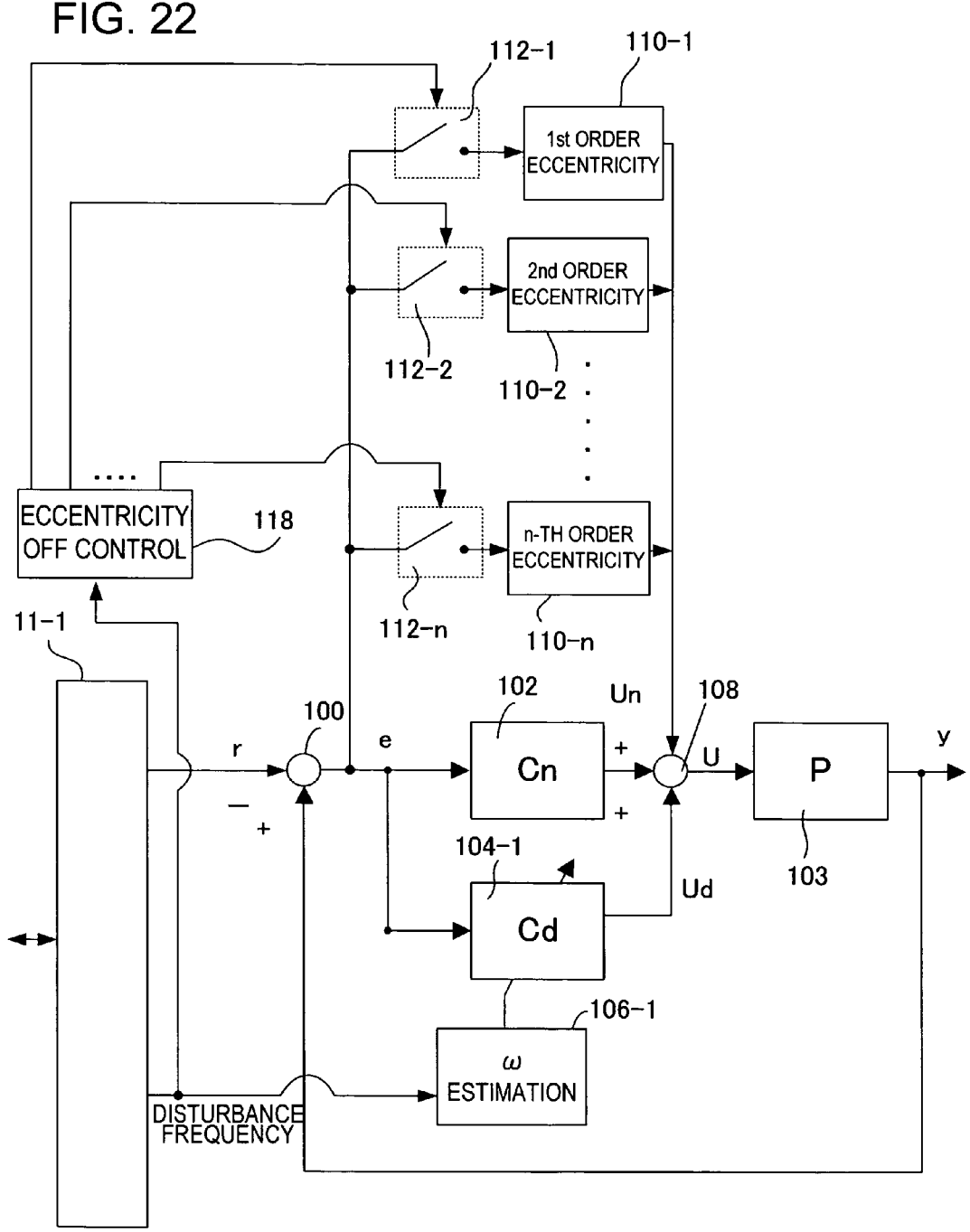
FIG. 22 is a block diagram depicting the positioning control system according to the fourth embodiment of the present invention.

FIG. 22 is a block diagram depicting the fourth embodiment of the position control system of the present invention. In FIG. 22, composing elements the same as FIG. 5 and FIG. 21 are denoted with the same reference symbols. In the present embodiment, the interface circuit 11-1 receives the disturbance suppression frequency from the outside, and sets it in the frequency converter 106-1. The frequency converter 106-1 converts this frequency into the above mentioned estimated gain, and sets it to the disturbance compensator 104. The disturbance compensator 104 performs adaptive control from this initial value (angular frequency).

Therefore in this embodiment, a known disturbance frequency is set as an initial value, so the estimated frequency starts directly from a known disturbance frequency, and the compensation current Ud of the compensator 104 follows up the disturbance frequency even if the actual frequency changes there after.

And the eccentricity OFF control block 118 receives this disturbance suppression frequency, and turns OFF the switches 112-1, 112-2, . . . , 112-n for correcting the eccentricity frequency near this disturbance suppression frequency out of the first, second, third, . . . , n-th order eccentricity correction blocks 110-1, 110-2, . . . , 110-n.

In this way, the positioning control system has a means to change the internal constant (angular frequency in the examples in FIG. 5 and FIG. 6) or the configuration according to the set value of the disturbance frequency which is selectively suppressed, and the disturbance frequency can be referred to or set from the outside via the interface 11-1.

A case when setting a disturbance suppression frequency from the outside is effective, for example in a case when a magnetic disk drive and another vibration source (e.g. optical disk drive, buzzer, vibrator) are mounted together on a device.

In such a case, the disk drive manufacturer does not know the vibration environment the disk drive will be subject to, and the vibration environment is determined in relation to the installation method by the set manufacturer and other units to be installed together. Therefore the present embodiment is effective when the set manufacturer measures the disturbance frequency which the disk device receives after installing the disk drive in the device, and this disturbance frequency is set from the outside when necessary.

Fifth Embodiment of Position Control System

Figure 23:
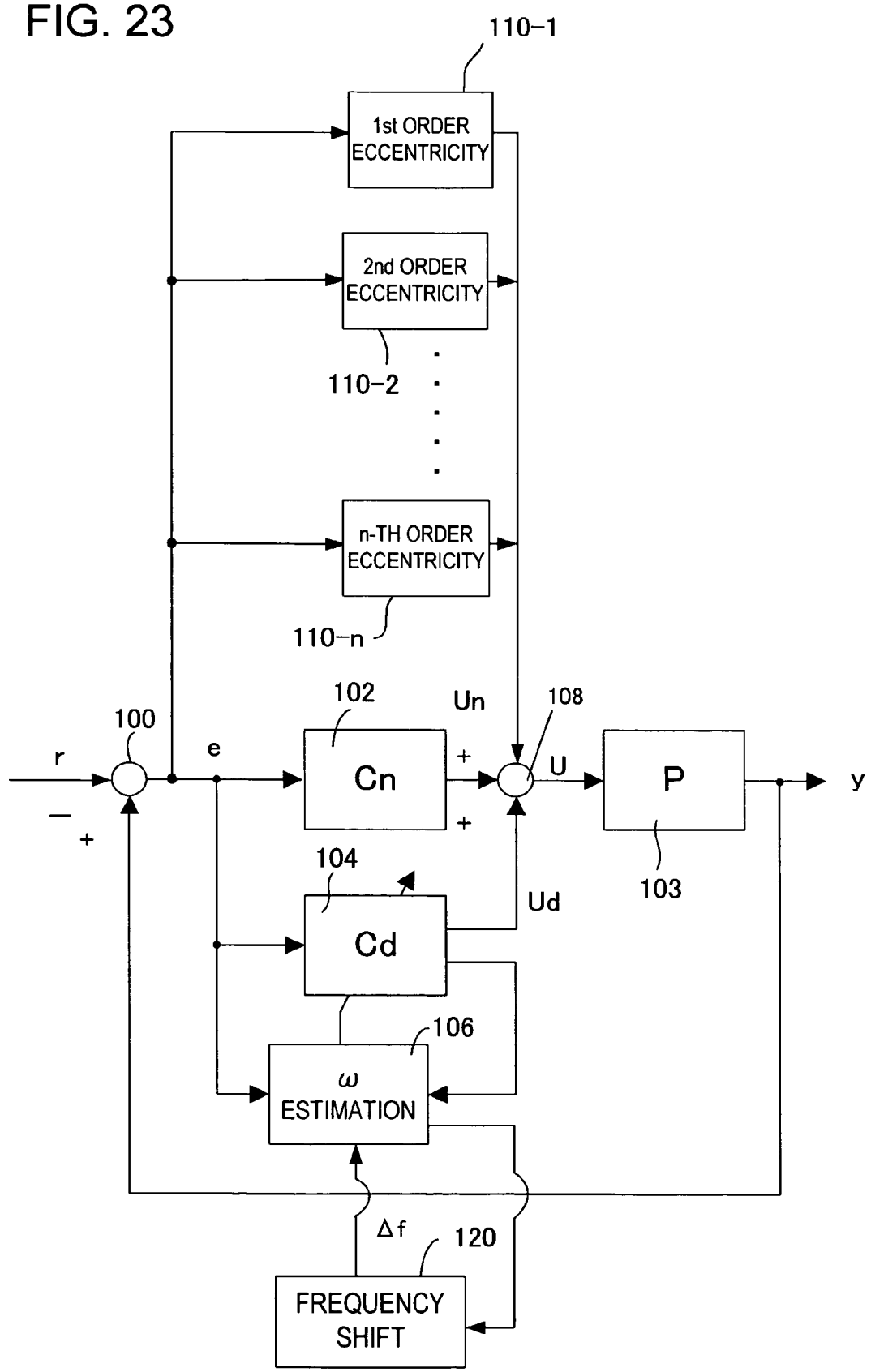
FIG. 23 is a block diagram depicting the positioning control system according to the fifth embodiment of the present invention.
Figure 24:
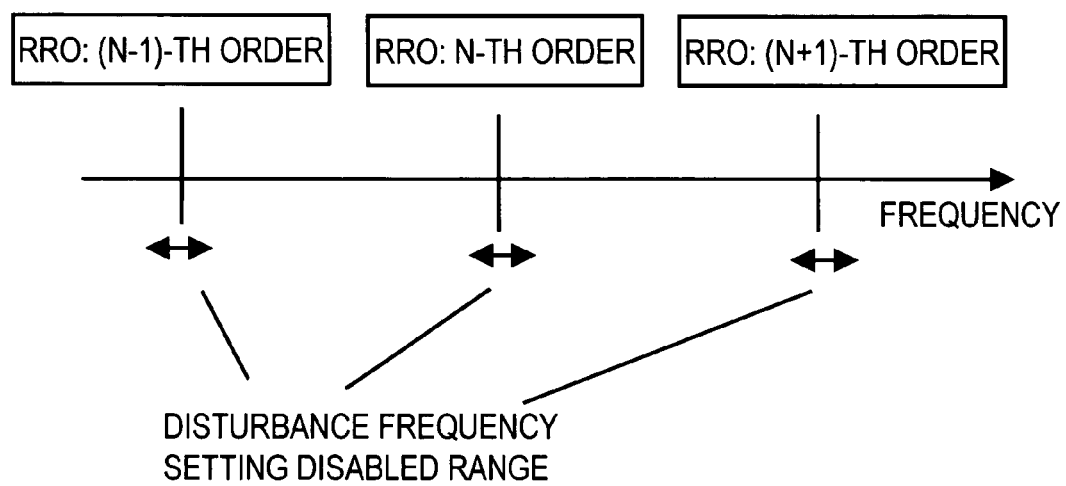
FIG. 24 is a diagram depicting the interference prevention operation in FIG. 23.

FIG. 23 is a block diagram depicting the fifth embodiment of the position control system of the present invention. FIG. 24 is a diagram depicting the embodiment in FIG. 23. In FIG. 23, composing elements the same as FIG. 5 are denoted with the same reference symbols. In the present invention, switches are not provided in the input stages of the first, second, third, . . . , n-th order eccentricity correction blocks 110-1, 110-2, . . . , 110-n. In other words, eccentricity correction is always ON. Instead, a frequency shift circuit 120 is provided.

The frequency shift circuit 120 holds a disturbance frequency Fd (n) of the current sample, which the frequency estimation unit 106 estimated, and a disturbance frequency Fd (n−1) of the previous sample, and if Fd (n) satisfies the conditions to interfere with the eccentricity correction, the frequency shift circuit 120 instructs the frequency estimation unit 106 to shift Fd (n) of the current sample in a plus or minus direction.

A shift direction, plus or minus, of the FD (n) of the current sample depends on the change direction determined by the difference between Fd (n) and Fd (n−1). As FIG. 24 shows, the frequency shift circuit 120 sets a value at the end of the area of the setting disable range (integral multiple of rotational frequency ± several Hz) in the frequency estimation unit 106. For example, if the change is in a positive direction, Fd (n) sets a frequency at the end in the + direction.

The present embodiment can also be applied to embodiments where a disturbance frequency Fd is set from the outside, as shown in FIG. 21 and FIG. 22. In this case, the frequency shift circuit 120 determines Fd/Frro as the rotational frequency Frro. This solution is rounded to integer value X, the difference between X and Fd/Frro is determined and the absolute value thereof is determined. In other words, abs (X−Fd/Frro) is calculated.

If this absolute value is smaller than a specified value, and the integer X is a frequency to be a target of eccentricity correction, then the disturbance frequency Fd is shifted so as to be outside the specified range. This specification range is several Hz, for example.

This method of shifting the disturbance frequency without turning OFF the eccentricity correction is for preventing the disturbance frequency overlapping the area of the integral multiple of the rotational frequency ± several Hz, such as 1 Hz and 3 Hz. Therefore the characteristic deterioration, due to phase change, can be tolerated to a degree.

Other Embodiments

In the above embodiments, the positioning control was described using an example of the head positioning device of a magnetic disk device, but the present invention can also be applied to other disk devices, such as optical disk devices. And the number of disturbance frequencies can be any value according to necessity.

The present invention was described using embodiments, but the present invention can be modified in various ways within the scope of the essential character thereof, and these variant forms shall not be excluded from the scope of the present invention.

When the eccentricity correction and disturbance suppression control are executed in the head positioning control system, the disturbance suppression frequency is detected, and the feedback of the eccentricity correction control of an eccentricity correction frequency near the disturbance suppression frequency is turned OFF, or the disturbance suppression frequency is shifted from the eccentricity correction frequency, so interference between the eccentricity correction and disturbance suppression can be prevented, and unstable eccentricity correction is prevented.

What is claimed is:

1. A head position control method for controlling a position of a head in a predetermined position of a disk storage medium by an actuator, comprising:
a step of computing a position error from a target position of the head and a current position acquired from the head;
a step of computing a control value of the actuator according to the position error;
a step of computing an eccentricity correction value of an eccentricity frequency of the disk storage medium according to the position error;
a step of computing a disturbance suppression value of a desired disturbance frequency according to the position error;
a step of computing a drive value of the actuator from the control value, the eccentricity correction value and the disturbance suppression value;
a step of detecting whether the disturbance frequency and a plurality of the eccentricity frequencies interfere with each other; and
an interference prevention step of turning OFF the computation of the eccentricity correction value for the eccentricity frequency, which interferes, according to the position error, or shifting the desired disturbance frequency, when the interference is detected.

2. The head position control method according to claim 1, wherein the step of computing the eccentricity correction value comprises a step of computing each eccentricity correction value for eccentricity frequencies corresponding to a plurality of orders of a rotation frequency of the disk storage medium respectively according to the position error.

3. The head position control method according to claim 1, wherein the step of computing the disturbance suppression value comprises:
a step of estimating the disturbance frequency by adaptive control according to the position error; and
a step of computing the disturbance suppression value from the position error using parameters corresponding to the estimated disturbance frequency.

4. The head position control method according to claim 1, wherein the step of computing the disturbance suppression value comprises:
a step of setting the disturbance frequency to be suppressed as an initial value;
a step of estimating the disturbance frequency by adaptive control using the disturbance frequency which is set as the initial value; and
a step of computing the disturbance suppression value from the position error using parameters corresponding to the estimated disturbance frequency.

5. The head position control method according to claim 1, wherein the step of computing the disturbance suppression value comprises:
a step of setting the disturbance frequency to be suppressed; and
a step of computing the disturbance suppression value from the position error using parameters corresponding to the disturbance frequency which is set.

6. The head position control method according to claim 1, wherein the interference prevention step comprises a step of turning OFF the input of the position error to the eccentricity correction value computing processing according to the position error for the eccentricity frequency which interferes.

7. The head position control method according to claim 1, wherein the interference prevention step comprises a step of shifting the disturbance frequency of processing, for computing a disturbance suppression value of a desired disturbance frequency, from the eccentricity frequency which interferes, according to the position error.

8. The head position control method according to claim 1, wherein the step of computing the control value comprises:
a step of generating state information using an estimated gain of the actuator according to an estimated position error between the position error and an estimated position of an observer; and
a step of computing a control value of the actuator from the state information by the observer control of a model of the actuator;
and the step of computing the disturbance suppression value comprises:
a step of generating state information using an estimated gain of the disturbance according to the estimated position error; and
a step of computing the disturbance suppression value from the state information by the observer control of a model of the disturbance, which is separate from the model of the actuator.

9. A disk device, comprising:
a head for at least reading data of a disk storage medium;
an actuator for positioning the head in a predetermined position of the disk storage medium; and
a control unit for computing a position error from a target position of the head and a current position acquired from the head, computing a control value of the actuator according to the position error, an eccentricity correction value of an eccentricity frequency of the disk storage medium according to the position error, and a disturbance suppression value of a desired disturbance frequency according to the position error, and computing a drive value of the actuator from the control value, the eccentricity correction value and the disturbance suppression value,
wherein the control unit detects whether the disturbance frequency and a plurality of the eccentricity frequencies interfere with each other, and turns OFF the computation of the eccentricity correction value for the eccentricity frequency, which interferes, according to the position error, or shifts the desired disturbance frequency, when the interference is detected.

10. The disk device according to claim 9, wherein the control unit computes each eccentricity correction value for the eccentricity frequencies corresponding to a plurality of orders of a rotation frequency of the disk storage medium respectively according to the position error.

11. The disk device according to claim 9, wherein the control unit estimates the disturbance frequency by adaptive control according to the position error, and computes the disturbance suppression value from the position error using parameters corresponding to the estimated disturbance frequency.

12. The disk device according to claim 9,
wherein the control unit sets the disturbance frequency to be suppressed as an initial value, estimates a disturbance frequency by adaptive control using the disturbance frequency which is set as the initial value, and computes the disturbance suppression value from the position error using parameters corresponding to the estimated disturbance frequency.

13. The disk device according to claim 9,
wherein the control unit computes the disturbance suppression value from the position error using parameters corresponding to the disturbance frequency to be suppressed which is set.

14. The disk device according to claim 9,
wherein the control unit turns OFF the input of the position error to the eccentricity correction value computing processing according to the position error for the eccentricity frequency which interferes.

15. The disk device according to claim 9,
wherein the control unit shifts the disturbance frequency of processing, for computing a disturbance suppression value of a desired disturbance frequency, from the eccentricity frequency which interferes, according to the position error.

16. The disk device according to claim 9,
wherein the control unit generates state information using an estimated gain of the actuator according to an estimated position error between the position error and an estimated position of an observer, and computes a control value of the actuator from the state information by the observer control of a model of the actuator, and also generates state information using an estimated gain of the disturbance according to the estimated position error, and computes the disturbance suppression value from the state information by the observer control of a model of the disturbance, which is separate from the model of the actuator.

17. A head position control device for positioning a head which at least reads data of a disk storage medium in a predetermined position of the disk storage medium by controlling an actuator, comprising:
a processing unit for computing a position error from a target position of the head and a current position acquired from the head, computing a control value of the actuator, an eccentricity correction value of an eccentricity frequency of the disk storage medium according to the position error, and a disturbance suppression value of a desired disturbance frequency according to the position error, and computing a drive value of the actuator from the control value, the eccentricity correction value and the disturbance suppression value; and
an interference prevention unit for detecting whether the disturbance frequency and a plurality of the eccentricity frequencies interfere with each other, and turning OFF the computation of the eccentricity correction value for the eccentricity frequency, which interferes, according to the position error, or shifting the desired disturbance frequency if the interference is detected.

18. The head position control device according to claim 17,
wherein the processing unit computes each eccentricity correction value for eccentricity frequencies corresponding to a plurality of orders of a rotation frequency of the disk storage medium respectively according to the position error.

19. The head position control device according to claim 17,
wherein the processing unit estimates the disturbance frequency by adaptive control according to the position error, and computes the disturbance suppression value from the position error using parameters corresponding to the estimated disturbance frequency.

20. The head position control device according to claim 17,
wherein the processing unit sets the disturbance frequency to be suppressed as an initial value, estimates a disturbance frequency by adaptive control using the disturbance frequency which is set as the initial value, and computes the disturbance suppression value from the position error using parameters corresponding to the estimated disturbance frequency.

21. The head position control device according to claim 17,
wherein the processing unit computes the disturbance suppression value from the position error using parameters corresponding to the disturbance frequency to be suppressed which is set.

22. The head position control device according to claim 17,
wherein the interference prevention unit turns OFF the input of the position error of the eccentricity correction value computing processing according to the position error for the eccentricity frequency which interferes.

23. The head position control device according to claim 17,
wherein the interference prevention unit shifts the disturbance frequency of processing, for computing a disturbance suppression value of a desired disturbance frequency, from the eccentricity frequency which interferes, according to the position error.

24. The head position control device according to claim 17,
wherein the processing unit generates state information using an estimated gain of the actuator according to an estimated position error between the position error and an estimated position of an observer, and computes a control value of the actuator from the state information by the observer control of a model of the actuator, and also generates state information using an estimated gain of the disturbance according to the estimated position error, and computes the disturbance suppression value from the state information by the observer control of a model of the disturbance, which is separate from the model of the actuator.

* * * * *